United States Patent [19]

Andros et al.

[11] Patent Number: 4,928,100
[45] Date of Patent: May 22, 1990

[54] PAGING RECEIVER FOR RECEIVING PAGES FROM ANALOG OR DIGITAL PAGING TRANSMITTERS

[75] Inventors: Andrew A. Andros, Spring, Tex.; Thomas J. Campana, Chicago, Ill.

[73] Assignee: Telefind Corporation, Coral Gables, Fla.

[21] Appl. No.: 110,512

[22] Filed: Oct. 20, 1987

[51] Int. Cl.⁵ .................. H04Q 7/00; G08B 5/22
[52] U.S. Cl. .................. 340/825.440; 340/825.48; 340/311.1; 375/5; 455/227; 455/142
[58] Field of Search .................. 455/227, 228, 9, 10, 455/25, 32, 34, 38, 193, 164, 154, 142; 375/89, 91, 5, 44, 45, 78, 88; 340/825.44, 825.65, 825.07, 825.52, 825.3, 825.04, 825.49, 311.1

[56] References Cited

U.S. PATENT DOCUMENTS

| | | | |
|---|---|---|---|
| 4,002,982 | 1/1977 | Catania | 375/5 |
| 4,006,462 | 2/1977 | Podowski et al. | 340/825.65 |
| 4,334,319 | 6/1982 | Gurry | 455/227 |
| 4,355,401 | 10/1982 | Ikoma et al. | 375/5 |
| 4,419,765 | 12/1983 | Wycoff et al. | 455/227 |
| 4,434,504 | 2/1984 | Fredrickson | 455/34 |
| 4,758,833 | 7/1988 | Dunkerton et al. | 340/825.44 |

Primary Examiner—Donald J. Yusko
Assistant Examiner—E. Pudpud

[57] ABSTRACT

A paging receiver is disclosed which is compatible with transmissions from analog or digital paging transmitters. The paging receiver has a command structure which permits it to be dynamically programmable to change its functionality including programming of the channels which the paging receiver is to receive. The programmability of the channels permits the paging receiver to be used for making national, regional, remote area, local area, and sublocal area pages, and pages to a group in the local area and to switch from channels which are heavily used during peak paging times to lesser used channels. The paging receiver transmits the paging receiver identification code digits in an order of increasing significance which significantly lessens power consumption for all paging receivers tuned to a particular frequency for determining if a page is to be received which prolongs paging receiver battery life. The paging receiver displays the place of origin of pages as either being of local origin or from other areas. The paging receiver antenna is continuously tunable to permit compensation for variation in antenna gain caused by environmental factors which can seriously degrade signal strength.

34 Claims, 22 Drawing Sheets

PAGING RECEIVER FOR RECEIVING PAGES FROM ANALOG OR DIGITAL PAGING TRANSMITTERS

APPENDIX

An appendix containing a hexadecimal code listing of the control program for the main central processing unit of FIG. 15 in the programming language used with the microprocessor illustrated therein is attached. The appendix contains subject matter which is copyrighted. A limited license is granted to anyone who requires a copy of the program disclosed therein for purposes of understanding or analyzing the present invention, but no license is granted to make a copy for any other purpose including the loading of a processing device with code in any form or language.

CROSS REFERENCE TO RELATED APPLICATIONS

The following reference is made to other applications which are filed on even date herewith which are incorporated herein by reference in their entirety.

"Paging Receiver With Dynamically Programmable Functionality", Ser. No. 110,664, filed on even date herewith.

"Paging Receiver With Paging Receiver Identification Code Digits Transmitted In Order of Increasing Significance", Ser. No. 110,511 filed on even date herewith.

"Paging Receiver Displaying Place of Origin of Pages", Ser. No. 110,522 filed on even date herewith.

"Paging Receiver With Continuously Tunable Antenna", Ser. No. 110,514 filed on even date herewith.

"Paging Receiver With Programmable Areas of Reception", Ser. No. 110,658 filed on even date herewith.

BACKGROUND OF THE INVENTION

FIELD OF THE INVENTION

The present invention relates to RF paging receivers which receive pages comprised of either numeric characters and/or alphanumeric characters and convey the page to a person possessing the paging receiver.

DESCRIPTION ON THE PRIOR ART

Paging systems are in use throughout the world. There are paging systems which transmit pages from satellite transmitters to different cities. An example of such a system is that operated by National Satellite Paging which transmits only numeric pages. A system operated by Metrocast permits pages to be transmitted to any city within the system through dedicated communication links between the cities. In the Metrocast system, pages to be transmitted locally are exclusively made by calling into the city where the page is to be made by a local telephone call. A page to be made on a regional basis is called in by an 800 number telephone call to a central facility in San Diego from which the page is transmitted to the city where the page is to be broadcast by the dedicated communication link. The page is received from the communication link at the city where it is to be broadcast and then broadcasted locally by an existing paging service to transmit the page to the person to be paged.

To date, there is no existing national paging system which substantially covers the geographical United States. Because of the cost of hardware, a system like the Metrocast system is not economical in small cities or rural areas where the paging volume is relatively low. Accordingly, while the objective of achieving nationwide paging has been attempted for many years, no existing system integrates local and national paging substantially throughout the geographical United States or throughout the world. The vast majority of paging systems operate totally locally with each system having a limited functionality because of its inability to deliver regional paging. Most paging receivers are tuned to receive only a single channel which inherently limits usage in time frames when heavy paging conditions exist in a local paging system and further prevent usage in other geographical locations where other channels are used.

Typically each existing paging system has unique specifications which prevents operation of one paging receiver in other systems. For example, the paging receiver identification codes are not universal. Furthermore, existing paging receivers will only receive transmissions from a single type of transmitter (analog or digital) systems. As a result of paging receivers differing in design and operation, the cost of paging receivers is higher as a result of smaller manufacturing volumes than would be realized if a single paging receiver was usable for a worldwide network.

Paging receivers in the Metrocast system cyclically scan a plurality of closely spaced channels to detect the presence of a page for the paging receiver on any one of the closely spaced channels. This paging receiver suffers from the inherent disadvantage that the continual scanning of the closely spaced channels requires a substantial power consumption causing the batteries of the pager to have a short life span. Short battery life increases the cost of operation and can cause pages to be lost when the batteries are not promptly replaced.

All paging systems currently issue a paging receiver identification code to each of the paging receivers for purposes of providing a unique identification. There currently is no universal standard for issuing identification numbers to pagers, with the largest system having capacity for issuing only 2,000,000 paging receiving identification codes. Worldwide, there currently are over 12,000,000 pagers in use with projected growth on an annual basis in the paging industry exceeding 20%. Thus, current paging systems do not permit a worldwide paging system to be realized as a result of the actual and projected number of pagers being far larger than the capacity of the identification codes in the largest existing paging system.

All pagers currently monitor the one or more channels which they are designed to receive to detect if a paging receiver identification code accompanying a page on the one or more channels on which they are designed to receive matches a stored paging receiver identification code. If a match exists, then a page is processed and an alarm and a display of the message is made to alert the wearer of the paging receiver of the message contained with the page. These systems transmit the pager identification code in an order of decreasing significance of the digits of the identification code. In other words, if a paging receiver has the identification code 12345, the transmitter precedes the transmission of the page with the sequence of digits 12345. Each pager which receives the channel on which the paging receiver identification code is transmitted continually detects each of the successive digits and maintains its radio frequency receiver on until a mismatch is found between the transmitted and stored paging receiver identification code digits. As a result of the fact that many paging receivers have identification codes in which their more significant digits are common to other paging receivers within a system, a substantial amount of battery power is consumed detecting if a page is intended for a particular paging receiver. Each paging receiver which receives the digits of the paging receiver identification code in an order of decreasing significance is statistically likely to have its radio frequency receiver turned on for most of the transmission of the digits of the paging receiver identification code until the lesser significant digits of the paging receiver identification code are received for the reason that it is the lesser significant paging receiver identification code digits which distinguish one paging receiver from another and only the least significant digit which distinguishes the paging receiver which is desired to receive a particular page from all other paging receivers. Accordingly, the transmission of the paging receiver identification code digits in an order of decreasing significance substantially increases power consumption lessening the life of the batteries of the paging receiver.

Throughout the world different frequency bands have been adopted for transmitting pages. In the United States, transmissions are authorized on VHF and UHF bands. In the United States, the channels of the VHF and UHF bands are separated by 5 KHz steps. Moreover, for each of these bands transmitters are in existence which transmit pages by frequency modulation of a digital carrier wave and other transmitters which transmit pages by frequency modulation of an analog carrier wave. Currently no paging receiver exists which is compatible with transmissions from both analog and digital transmitters. Furthermore, Europe has allocated VHF for paging with individual channels being separated by 6.25 KHz steps and Far Eastern countries has allocated paging channels on a 280 MHz VHF band with individual channels being separated by 2.5 KHz steps. Currently, no paging receivers exist which are operational on any more than one of the above-identified frequency bands. The inability of current paging receivers to receive pages on the different frequency bands allocated throughout the world prevents worldwide paging to be received on a single paging receiver.

None of the commercially marketed paging receivers are programmable by command to receive different channel which severely restricts the paging receivers to usage in limited geographical areas. In the United States there are a large number of paging channels in use in different geographical parts of the country. Because of the fact that the existing paging receivers cannot be programmed by command to receive different channels, it is impossible to universally receive pages throughout the country because of the fact that reception of channels is limited to a single channel frequency fixed upon obtaining the paging receiver from the paging service or to cyclically scan a group of closely spaced channels such as with the paging receiver used by the Metrocast system. Neither approach leads itself to being dynamically usable to accept pages in another geographical area where a different channel or channels are in use. The prior art paging receivers' inability to rapidly change the channel which may be received severely limits the usage of paging for business or other travel.

In the prior art as a consequence of paging receivers being designed to receive only a single channel in a particular frequency band or to scan a sequence of closely spaced channels, antenna gain has not been a problem in achieving reception of pages with sufficient signal strength to permit proper decoding and display of the page. Antenna tuning systems have been used to tune a receiver's antenna in military communication for maximum antenna gain prior to receiving communications. However, these systems do not tune antenna gain dynamically during the reception of the communication. When a paging receiver is used to accept multiple bands of channels, environmental characteristics such as variable inductance and capacitance which vary with location, will tend to prevent maximum antenna gain from being achieved especially when the paging receiver is being carried by a person in motion.

Currently, no paging system exists which truly permits paging on a national and international level. This is a consequence of the inability of the paging receivers to receive a large number of channels and further the deficiency of the existing systems in having a universal paging receiver identification code which uniquely identifies each of the paging receivers throughout the world with the possibility existing in the current systems of several pagers having the same paging receiver identification code. A universal paging receiver identification code is needed having the capacity to uniquely identify all of the paging receivers throughout the world.

Currently in the United States a relatively small number of channels are used in the large metropolitan areas where most of the paging traffic occurs. As paging traffic increases in view of the relatively small number of channels predominantly in use in metropolitan areas, there is the likelihood that message traffic during the three peak paging periods that occur each day will increase to the point where the predominantly used small number of channels will become so busy that it is impossible to rapidly transmit pages to a paging receiver. Because of the fact that current paging receivers are not programmable by remote command to receive pages on different channels, existing networks do not have the ability to dynamically switch channels in large metropolitan areas, when one channel becomes so busy that rapid paging is not possible, to another lesser used channel to eliminate delays in transmitting pages to a paging receiver. In fact, in large metropolitan areas there currently are VHF and UHF mobile channels that are currently under utilized due to the current cellular radio system which could be used as alternative paging channels to receive traffic on commonly used stations.

FM analog and digital paging protocols exist. Existing protocols for the FM analog and digital paging systems do not have a high efficiency in transmitting data per transmitted code. Existing digital transmitters modulate a digital FM transmitter with a binary signal which utilizes frequency shift keying of the basic carrier signal to transmit high levels of a bit with a burst of the shifted frequency and the low level bit with the unshifted frequency of the carrier. Thus, each identifiable digit of the transmission from an FM digital paging transmitter can encode only two distinct levels for each frequency burst of the carrier. Analog FM paging transmitters frequency modulate a sinusoidal carrier with a total of 15 tones to create a hexadecimal value transmitting system in which no modulation of the basic carrier frequency is considered to be the "F" level and the remaining 15 different levels are encoded by modulating the FM carrier with distinct tones. Paging receivers which are designed to receive analog transmissions require substantial reception time of each tone to validly detect each character. Thus, while the protocol of FM analog paging transmitters transmits a much higher number of data levels for each frequency burst, the slowness of the paging receivers in detecting the discrete tones does not result in a high throughput speed of transmitting characters.

Existing paging systems which permit paging in multiple cities suffer from the deficiency that a long distance phone call is required to phone in a page which is to be transmitted to a remote city. Because of the fact that the long distance phone call is charged to the person wishing to make the page or to the operator of the system (800 service), the expense of using these paging systems is increased and may discourage users from making non-local pages. No national or regional prior art paging system permits a page to be initiated from a geographic area outside the area where the paging receiver is normally located by the making of a local phone call and further for the paging receiver to be programmed to receive the page on a particular frequency found at the location where the page is to be received.

Current paging receivers do not execute a repertoire of commands permitting the functional characteristics of the paging receiver to be programmed dynamically by RF transmission. Current paging receivers do respond to commands which provide an alarm to the person wearing the paging receiver that a page has been received such as activating a display and/or providing an audio alarm. However, current paging receivers do not execute a diversity of commands in which the system influences operation and structure of the paging receiver, including commands activating the display to indicate if the page has originated locally or from another region, causing the message transmitted with the page to be stored in a particular memory location in the paging receiver and programming the channels on which the paging receiver is to receive pages and permitting the paging receiver to serve as a relay for pages either to be transmitted or received.

Moreover, the prior art paging receivers do not control the scanning of channels in accordance with a program which automatically causes the RF receiver to monitor the channel on which the last page was received for a predetermined time interval and if no carrier is detected on that channel then scanning one or more additional programmed channels for a predetermined time interval until either a carrier is detected on one of the channels being scanned in which case that channel is scanned for the predetermined time interval or in the absence of any carrier being detected on the one or more channels being scanned shutting down the RF receiver after the predetermined time interval. No prior art paging system is known in which a code is transmitted with the paging receiver identification code to restrict reception of pages in particular geographic areas.

Cellular radio systems dynamically assign channels on which cellular radio receivers are to receive telephone calls. To make or receive a telephone call, a mobile cellular radio is locked onto a set up channel through communications with the transmitter which are established when the cellular radio receiver is turned on. The cellular system then assigns the mobile cellular radio to a specific channel while the mobile cellular radio is making or receiving a telephone call within a cell. As the cellular radio receiver moves from one cell to another cell, the channel is dynamically changed from one channel to another channel to maintain a strong signal. A cellular radio receiver does not have a channel memory which stores channels which are to be scanned to establish if a call is forth coming. The dynamic assignment of a channel is initiated by the transmitter for the sole purpose of establishing the channel over which voice communications are to be initiated or to be maintained when moving from one cell to another.

U.S. Pat. No. 4,422,071 discloses a system for programming an identification code of a receiver by a radio frequency communication between a transmitter and the receiver.

SUMMARY OF THE INVENTION

The present invention provides the first paging receiver which is compatible with all existing UHF and VHF paging frequency bands and existing paging system FM analog and digital transmitters found in the United States, Japan and Europe. A paging receiver in accordance with the present invention may be programmed dynamically to receive channels in multiple bands including the VHF and UHF bands in the United States, the VHF band in Europe and the 280 VHF Japanese band. The dynamic programmability of channels of the paging receiver of the present invention permits operation in all of the geographic areas identified above with a single paging receiver by programming the paging receiver by a channel programming command to receive one or more channels in the geographic areas to which the pager will be transported. The transmitter transmitting the page in the area where the paging receiver is to receive the page transmits the page on a channel which the paging receiver has been dynamically programmed to receive the page.

The paging receiver of the present invention and its protocol is compatible with all existing analog and digital transmitters and permits pages transmitted by either analog or digital paging transmitters to be received by a single paging receiver with total transparency to the user of the paging receiver. Furthermore, the adoption of a universal protocol in which each code transmission by a FM digital transmitter encodes multiple values of signals greater than two achieves a high data throughput rate. Moreover, the signal processing circuitry of the paging receiver provides a rapid response time to each transmitted code from either an analog or digital transmitter which further permits the time duration of transmission of each character to be shortened providing a high data throughput. Finally, in accordance with a preferred embodiment of the present invention, a paging receiver identification code format is adopted which permits 100,000,000 distinct paging receivers to be used by the system enabling international use.

The present invention substantially enhances the battery life of batteries used to power the paging receiver. In the first place, each digit of the paging receiver identification code is transmitted as a header on each page in an order of increasing significance of the paging receiver identification code digits. The paging receiver compares each received paging receiver identification code digit with the corresponding digits of its unique stored paging receiver identification code to detect if a mismatch exists at which time the paging receiver tuner is turned off to conserve power until it is turned on again under a control program of the main central processing unit. The comparison of the transmitted paging receiver identification code digits and the stored pager receiver identification code digits continues sequentially until either a total match is found at which time the command and/or page transmitted with the paging receiver identification code is processed or the paging receiver tuner is shut down to conserve power.

Furthermore, reception of pages by a particular paging receiver may be restricted by use of a destination code. Each paging receiver contains a memory for storing a destination code. Pages which are to be received on an area basis by a paging receiver are transmitted with the destination code being the first digit of the transmission of the paging receiver identification code. If a match is not found between the transmitted destination code and any stored destination code contained in the memory of the paging receiver tuner, the paging receiver is immediately shut down to conserve power. If a match is found between a transmitted destination code and any stored destination code, the paging receiver then processes the subsequently transmitted paging receiver identification code digits which are transmitted in an order of increasing significance of its digits as described above. The invention eliminates the problem of each paging receiver which is to receive a national or regional page from responding to resident local paging which consumes substantial amounts of battery life.

Furthermore, in accordance with the invention, each paging receiver contains a memory for storing the last channel on which a carrier was detected. The control program of the main central processing unit for the paging receiver automatically activates the paging receiver to receive the last channel first because of the statistical probability that pages are more likely to be found on that channel than on additional channels stored in a channel memory which are thereafter received by the paging receiver in an order determined by a control program. Battery life is enhanced by ordering the sequence in which channels are to be received such that the statistically most likely channel on which a transmission is likely to be received is the first channel received when a plurality of channels are to be scanned for the presence of carrier.

The diverse command repertoire of the paging receiver further enhances its usage by permitting programming of channels, processing of storage location of pages in memory, place of origin display of pages, use of the paging receiver to relay pages to external devices and regional or group specific reception of pages.

A RF paging receiver for receiving pages transmitted from either a frequency modulation digital paging transmitter or from a frequency modulation analog paging transmitter in which characters of the page are transmitted by frequency modulation of a carrier with a plurality of channels being used to encode the characters with the carrier being frequency modulated by the plurality of frequencies in accordance with the invention includes a receiver and discriminator for converting the modulated carrier into a sinusoidal signal having discrete frequencies with each frequency being one of the plurality of frequencies; an amplifier for amplifying the sinusoidal waveform to create a square wave having a period equal to a period of the sinusoidal signal; a digital filter having a plurality of distinct pass bands each centered around a different one of the plurality of frequencies, the digital filter outputting a square wave when the square wave period falls within one of the pass bands of the digital filter and blocking passage of all square waves falling outside the pass band of the digital filters; counting circuitry, coupled to the digital filter, for converting each output of the digital filter into a number proportional to the period of the square wave passed by the digital filter; and a character processor, responsive to the counting circuitry, for outputting characters each having an identity determined by the value of one or more numbers produced by the counting circuitry. The counting circuitry samples the output of the digital filter at a frequency higher than the highest of the frequencies. The counting circuitry includes a sampling circuit, responsive to the output of the digital filter, for sampling the output of the digital filter with a fixed frequency over a fixed period of time to produce a number of samples directly proportional to the frequency of the square wave passed by the digital filter, a counter, coupled to the circuit for sampling, for counting the number of samples of the output of the digital filter which have a high state during the fixed time period of sampling; and the count outputted by the counter being processed by the character processor to output the characters. The character processor includes a first memory for storing a plurality of ranges of addresses with a different range of addresses being associated with each of the frequencies, each range of addresses defining a narrower frequency range passband than a corresponding frequency range passed by the digital filter; a comparator, coupled to the counter and to the first memory, for outputting the count of the counter when a comparison of the count falls within one of the plurality of addresses stored in the first memory and not outputting the count of the counter when the count falls outside all of the addresses stored in the first memory; a second memory, coupled to the output of the comparator, for outputting a value stored at an address equal to the count outputted by the first comparator, the second memory having a plurality of addresses associated with each of the plurality of frequencies with each address associated with a separate one of the plurality of frequencies storing a single value; and the values of the output of the second memory are processed to output the characters. The character processor further includes a circuit for combining successive values and processing the combined successive values into a character. The plurality of frequencies is equal to 16 and each frequency is used to encode one of 16 possible levels of character data. The characters are encoded at the transmitter with a two digit base ten encoding format and two successive frequencies are used to transmit a single character. A shift register is provided having an input coupled to an output of the amplifier and an output coupled to the digital filter, the shift register having a number of stages requiring a predetermined time duration of the square wave produced by the amplifier to be applied to an input to produce an output, and the shift register being periodically reset. The character processor further includes a signal duration comparison circuit having an input coupled to the output of the second memory for outputting the value if it has a duration greater than a predetermined time duration and not outputting any value if any value applied to the input has a duration less than the predetermined duration and the output of the signal duration circuit is processed to output characters. A circuit for lessening frequency jitter in the square wave applied to the shift register is coupled to the output of the amplifier.

DESCRIPTION OF THE PREFERRED EMBODIMENT

I. Paging Receiver Architecture

Figure 1:
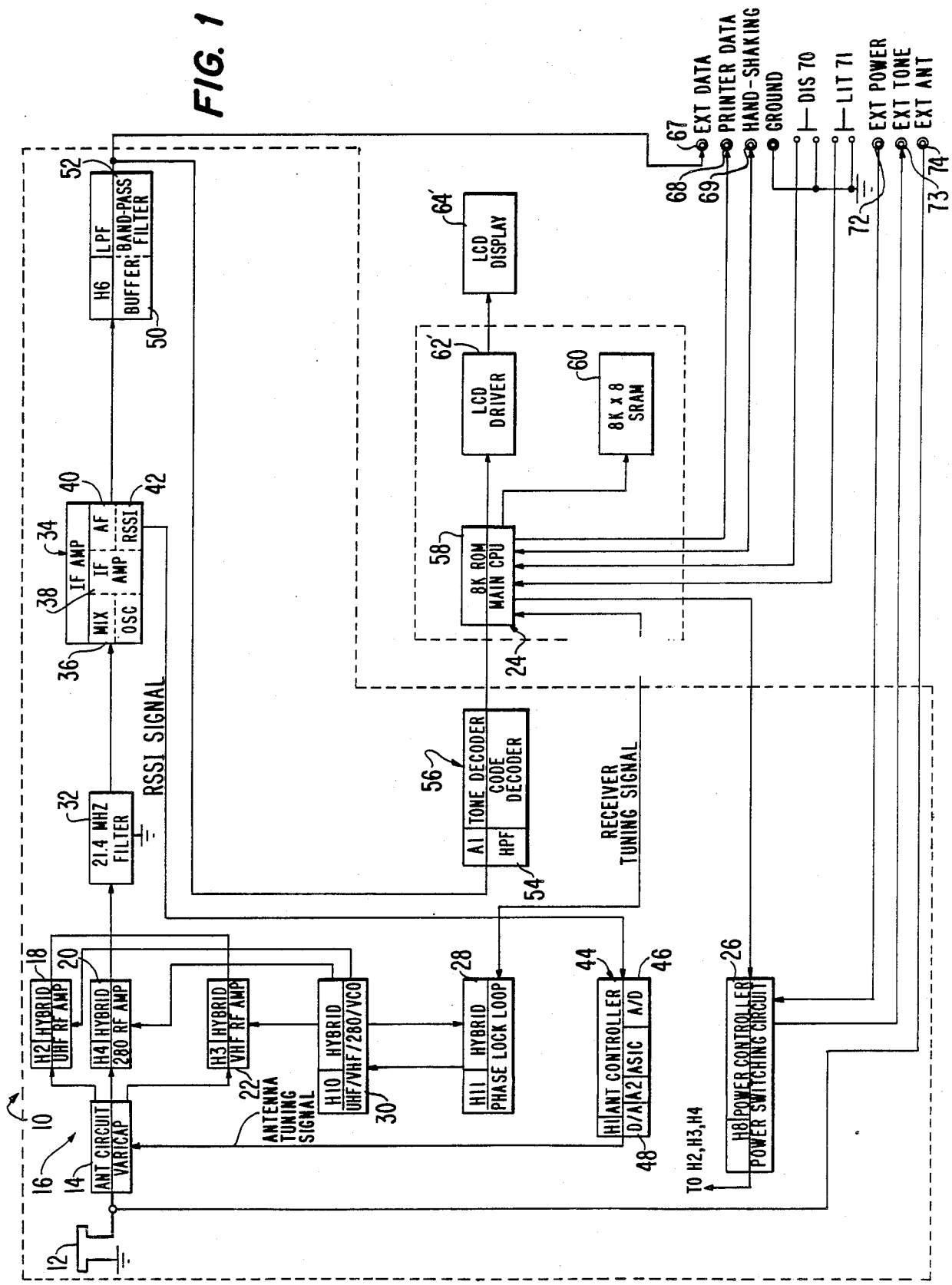
FIG. 1 is a block diagram of a preferred embodiment of a paging receiver in accordance with the present invention.
Figure 7:
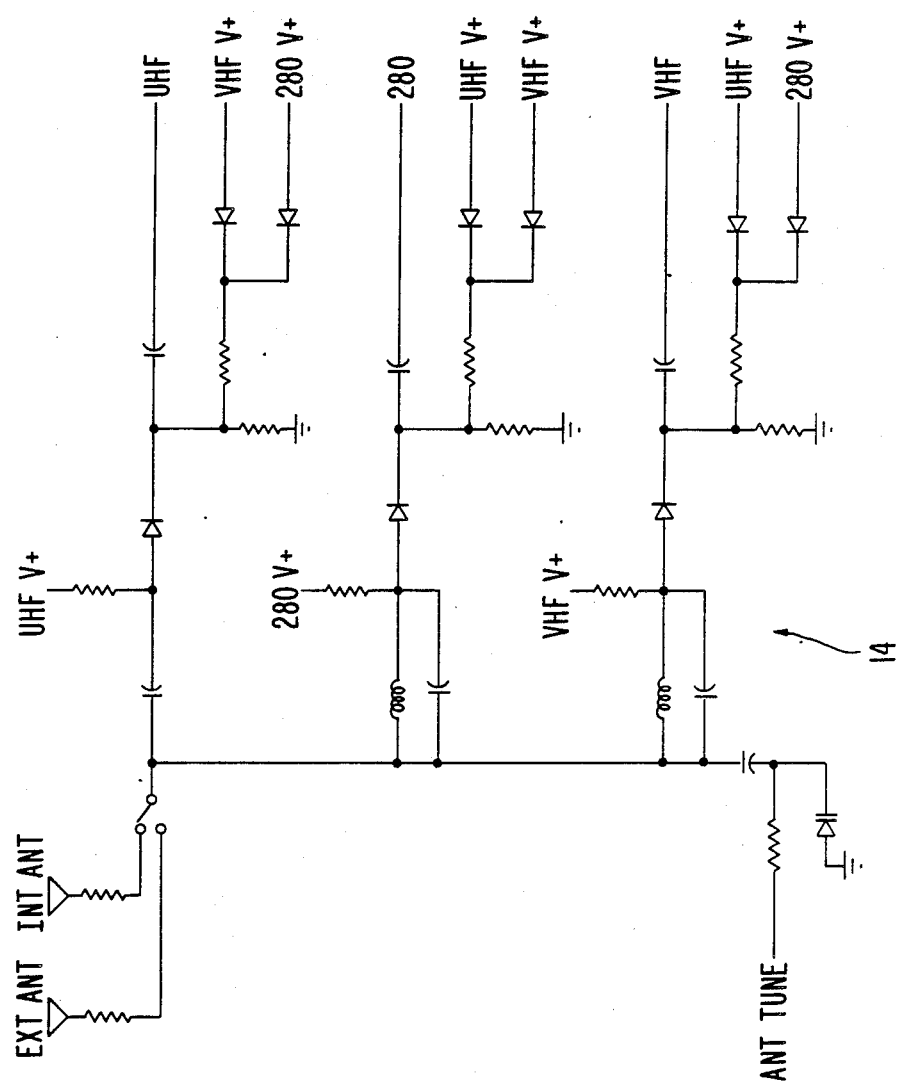
FIG. 7 is a circuit schematic of the antenna circuit 14 of FIG. 1.
Figure 8:
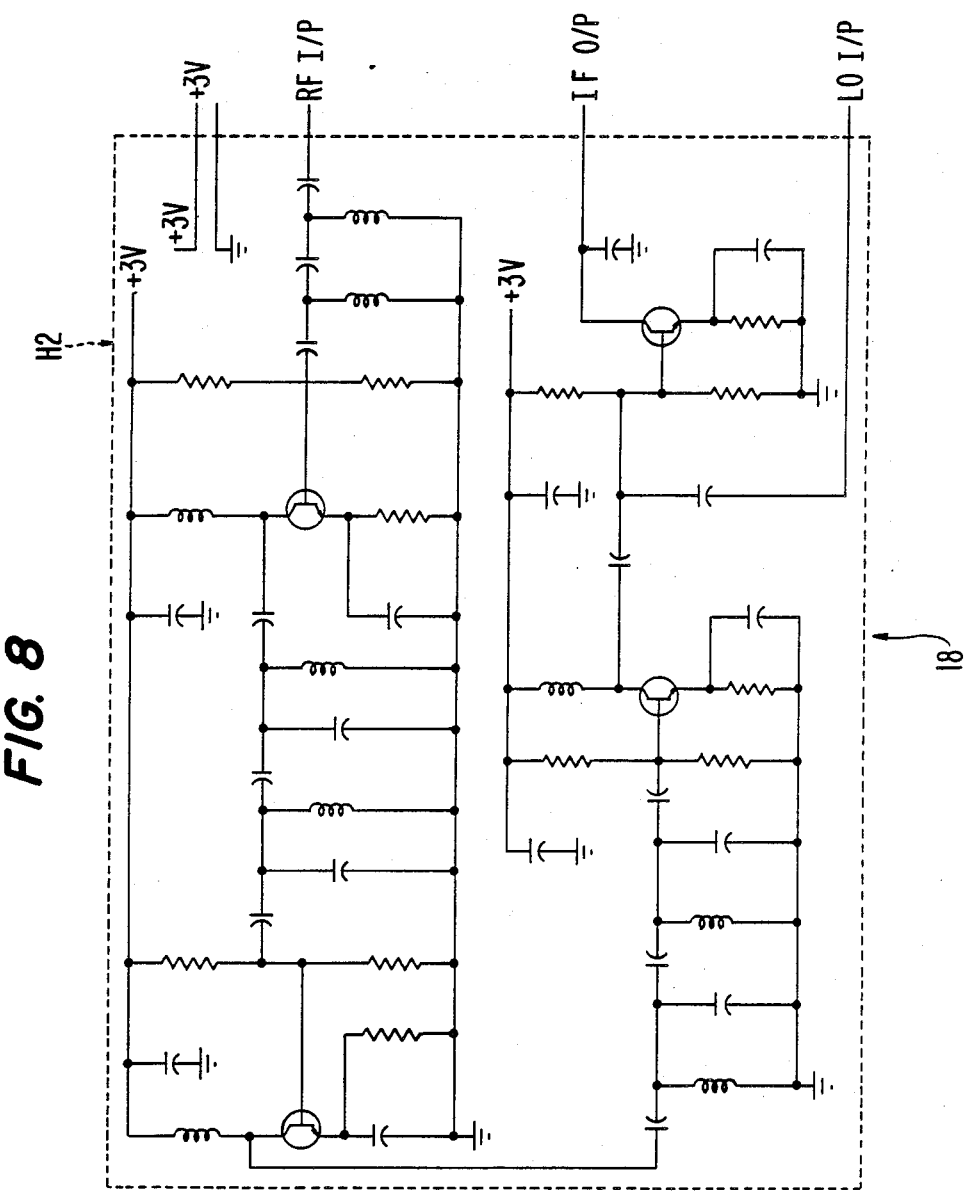
FIG. 8 is a circuit schematic of the amplifier and mixer 18 of FIG. 1.
Figure 9:
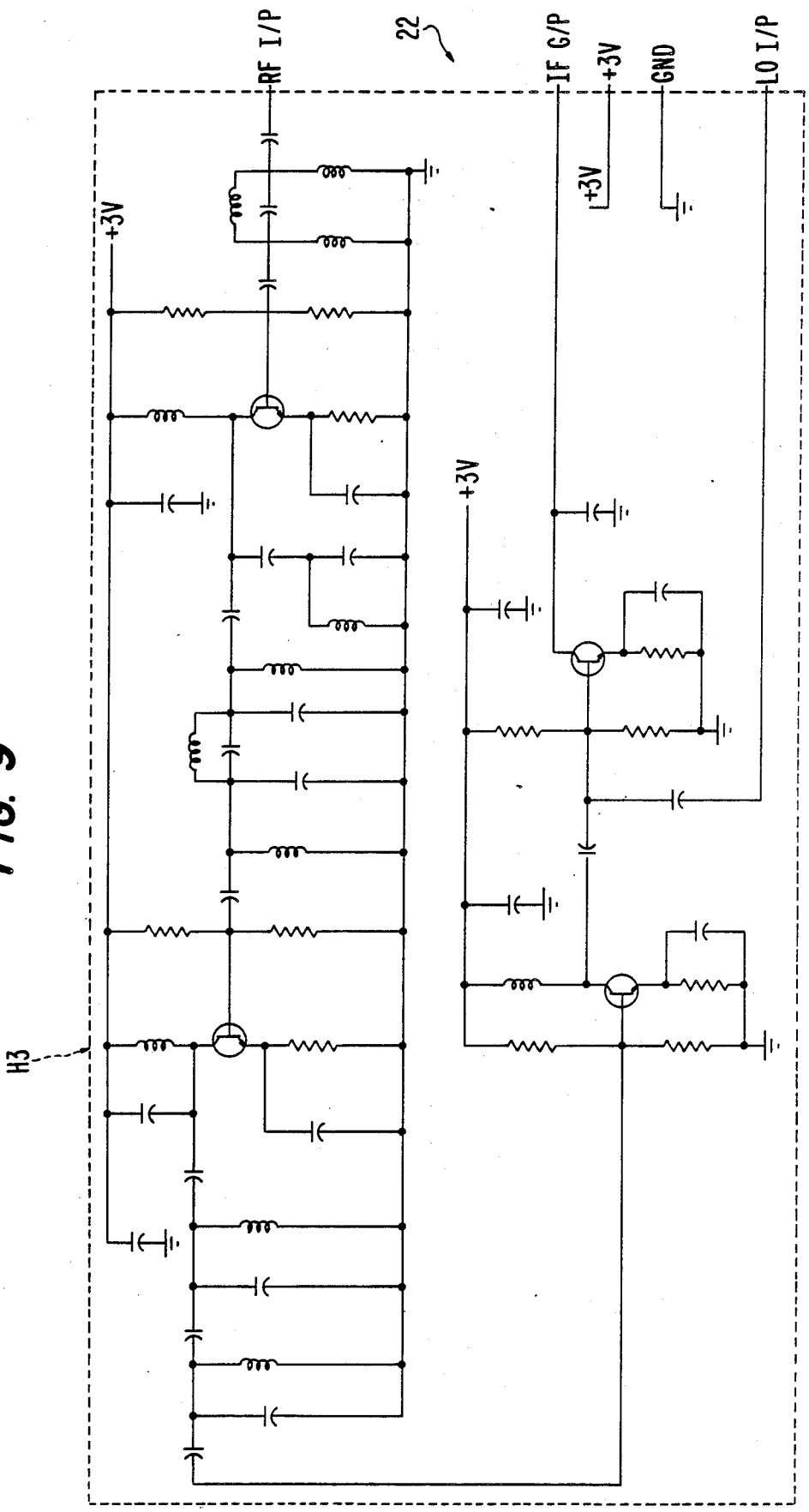
FIG. 9 is a circuit schematic of the amplifier and mixer 22 of FIG. 1.
Figure 10:
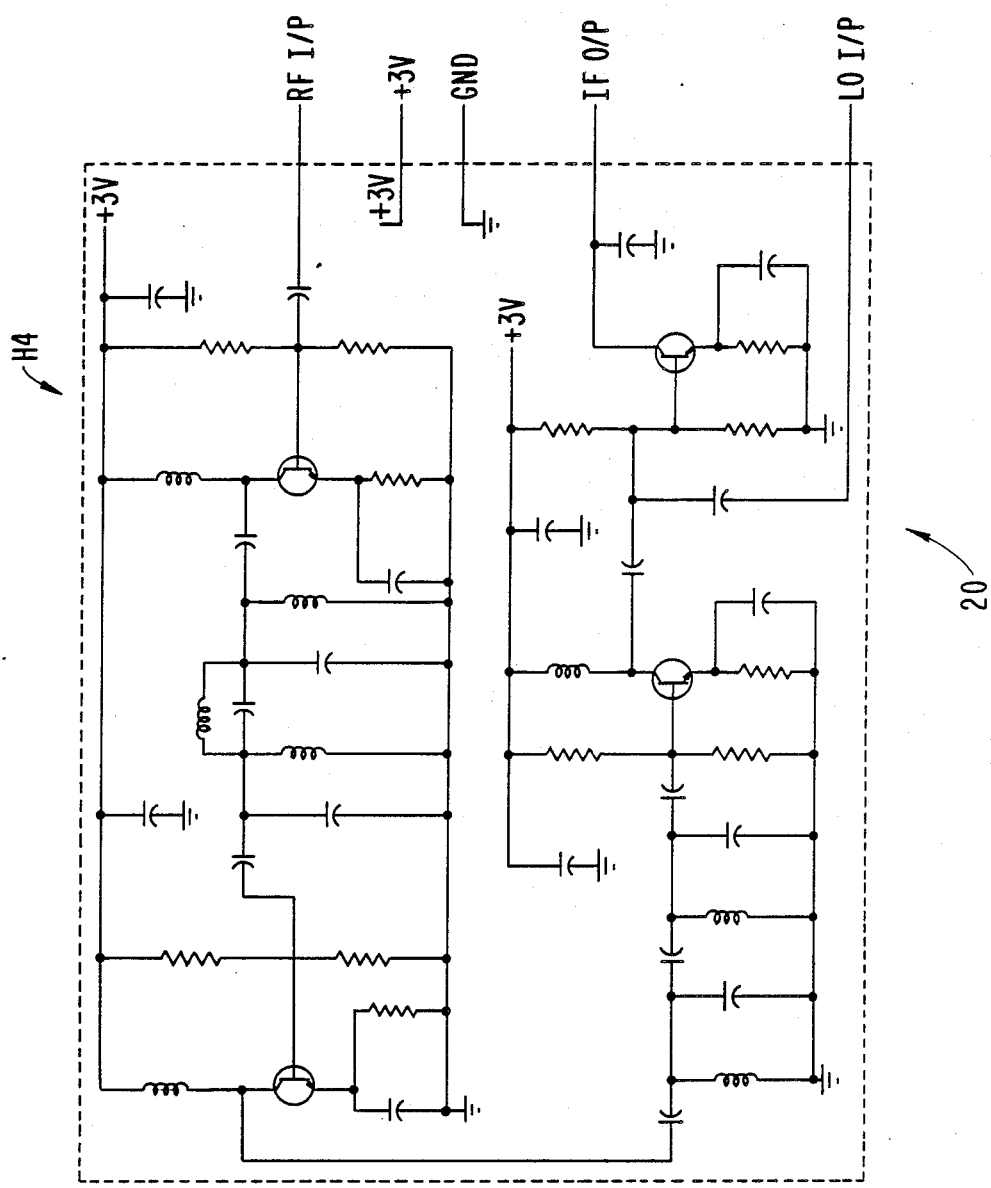
FIG. 10 is a circuit schematic of the amplifier and mixer 20 of FIG. 1.
Figure 11A:
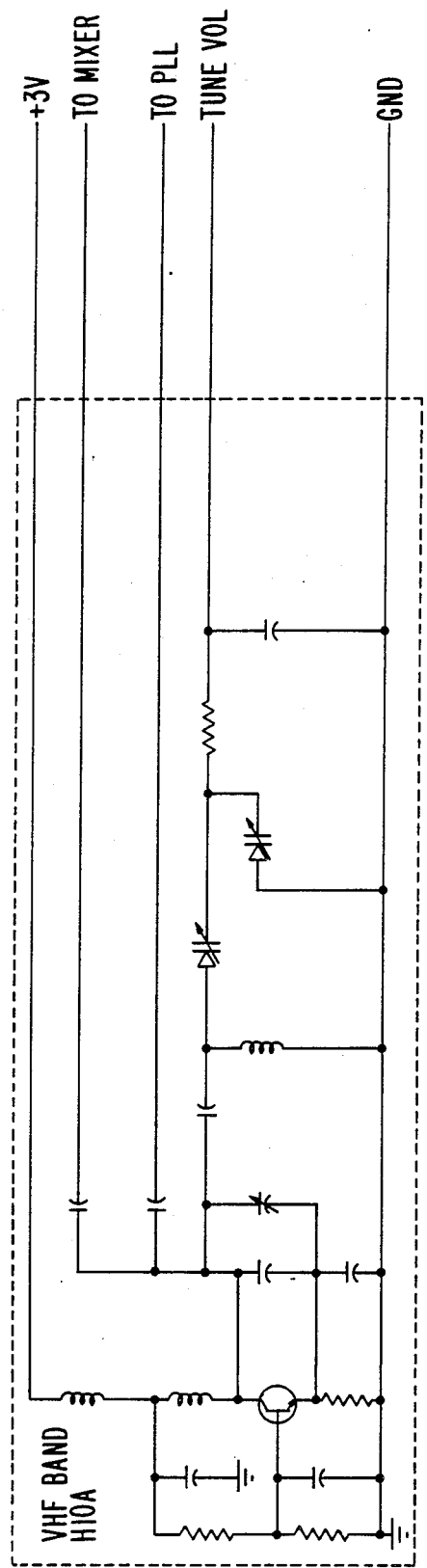
FIGS. 11A-C are a circuit schematic of the voltage controlled oscillator 30 of FIG. 1.
Figure 11B:
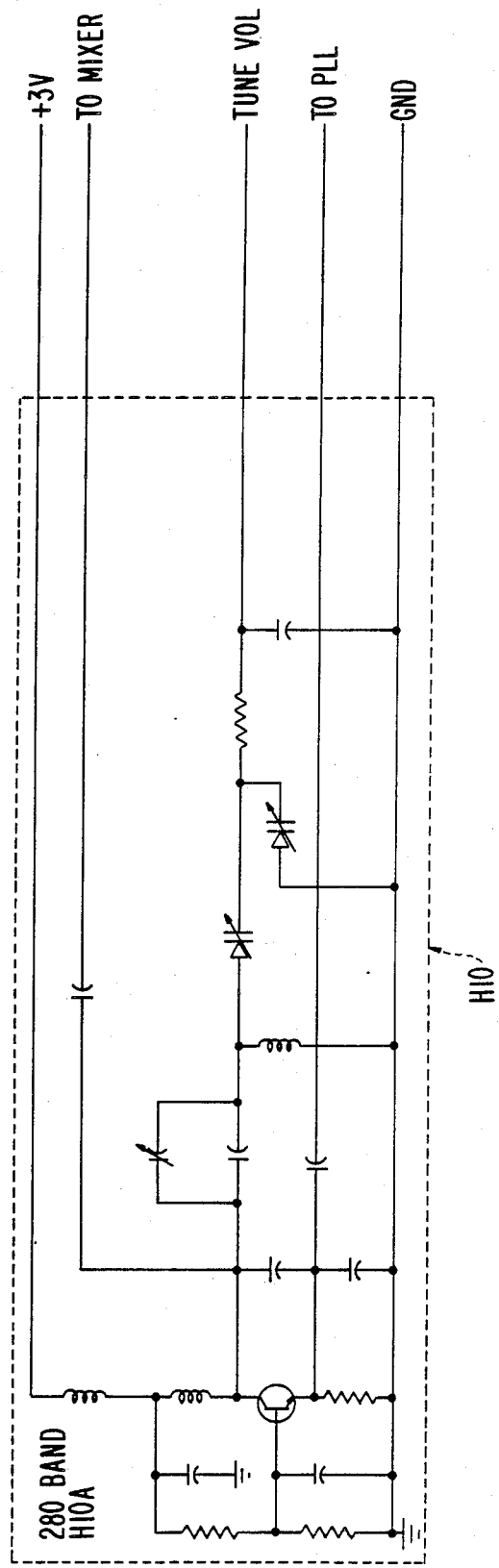
Figure 11C:
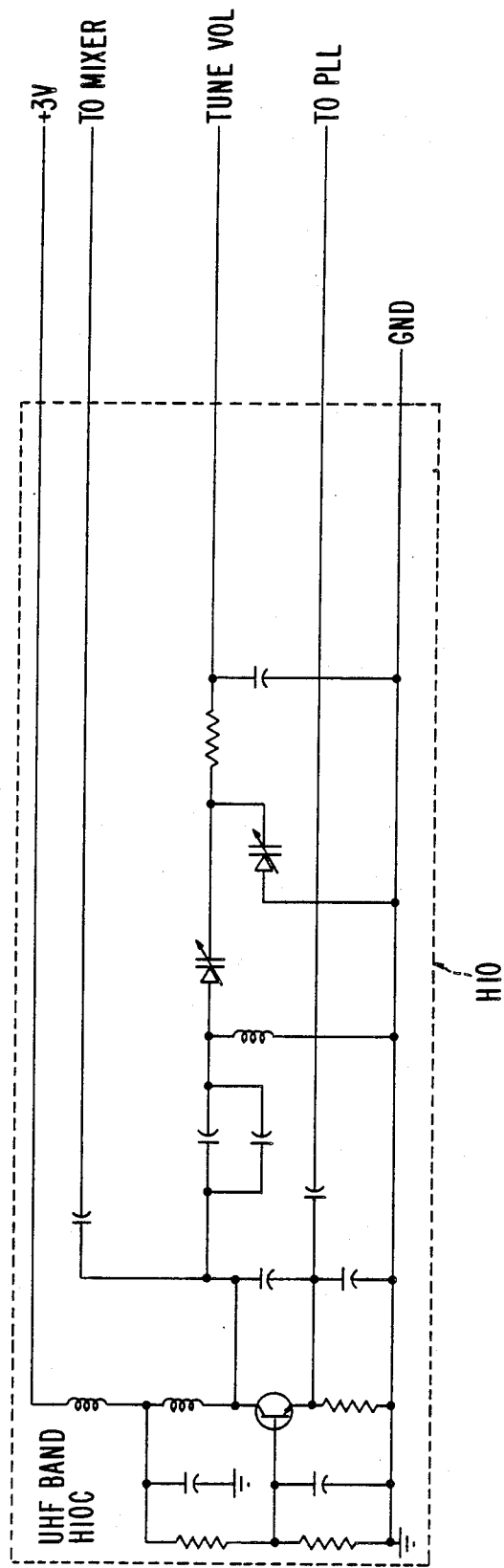
Figure 12:
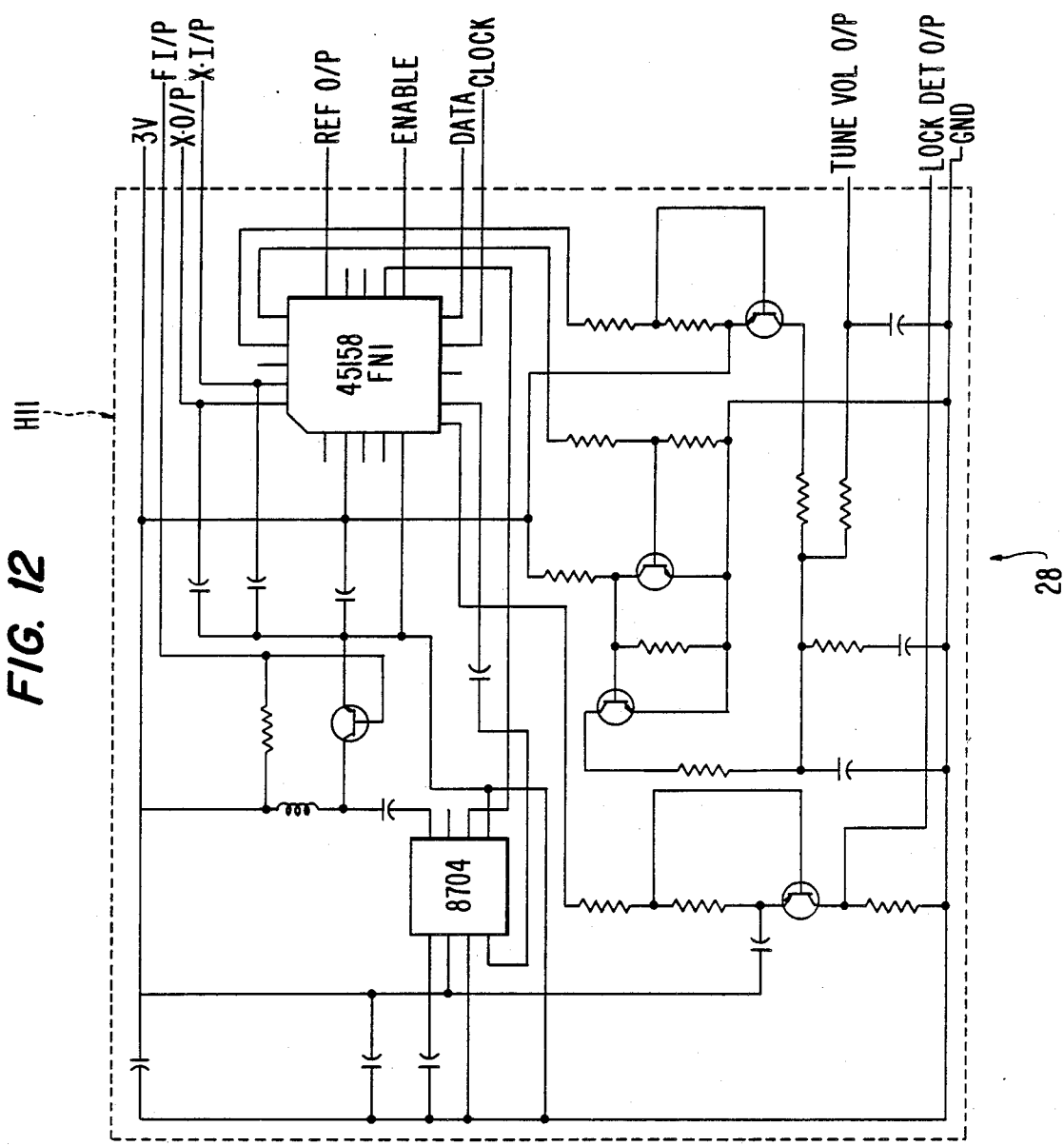
FIG. 12 is a circuit schematic of the phase lock loop 28 of FIG. 1.
Figure 13:
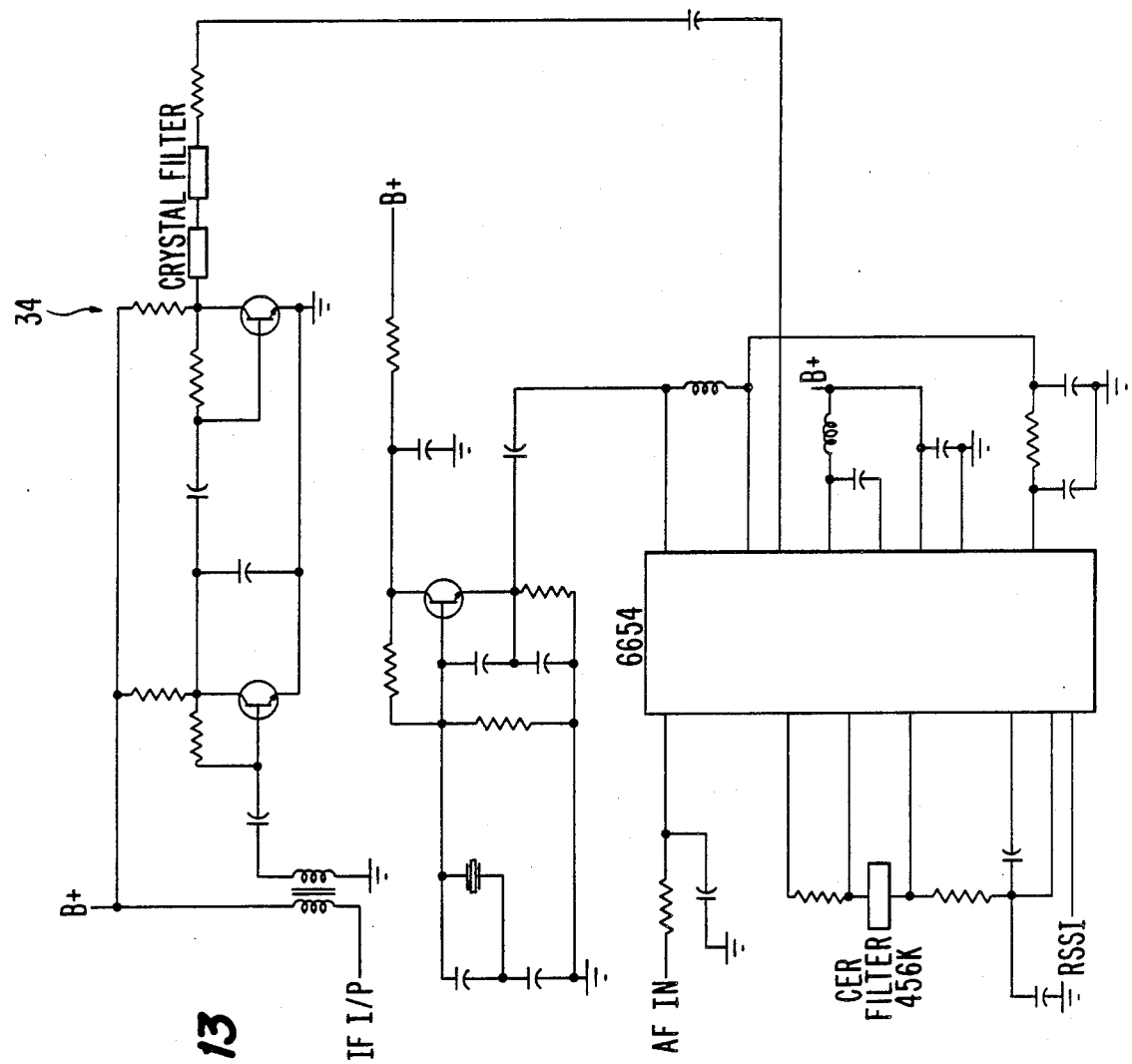
FIG. 13 is a circuit schematic of the IF processing circuit 34 of FIG. 1.
Figure 14A:
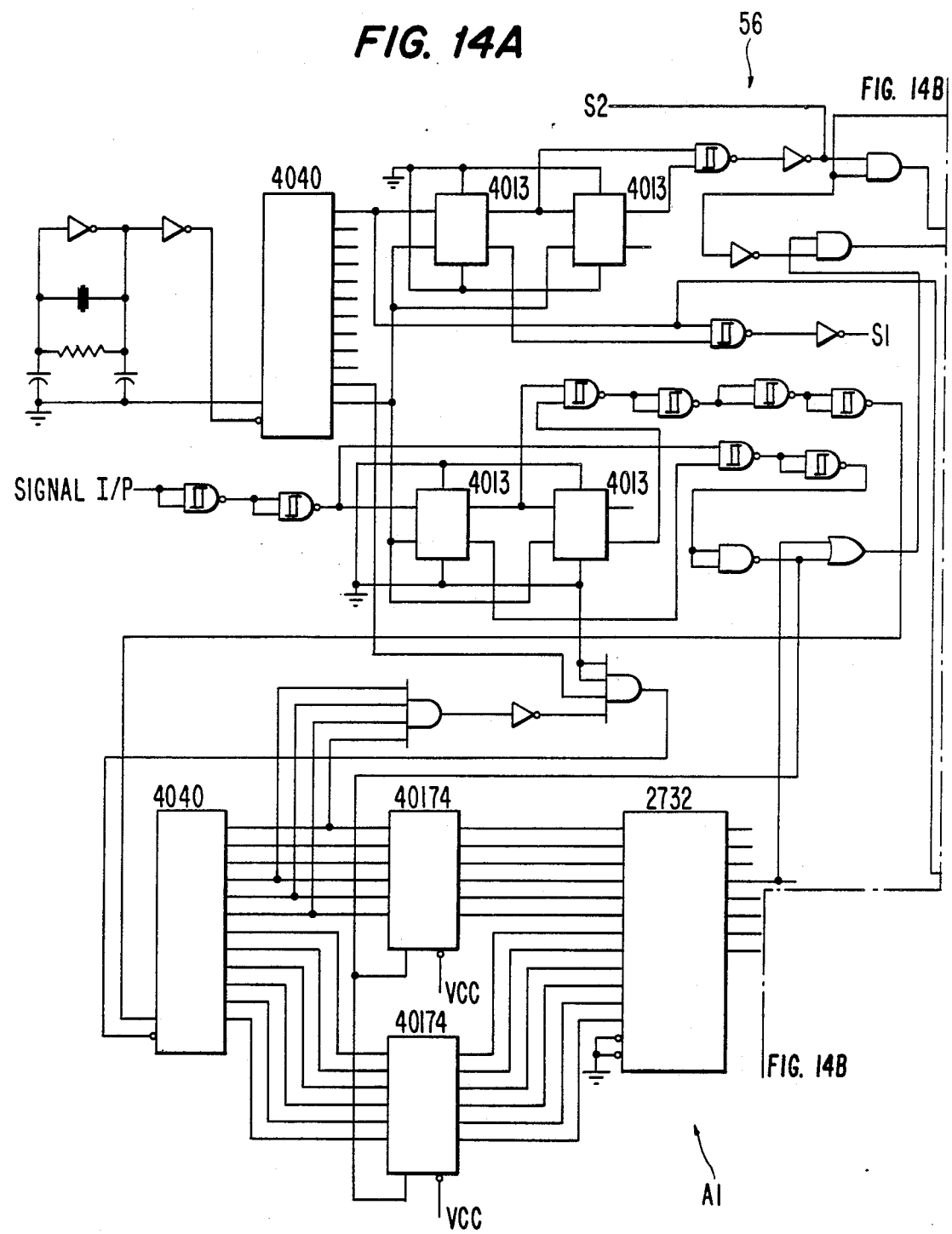
FIGS. 14A-B are a circuit schematic of the tone decoder 56 of FIG. 1.
Figure 14B:
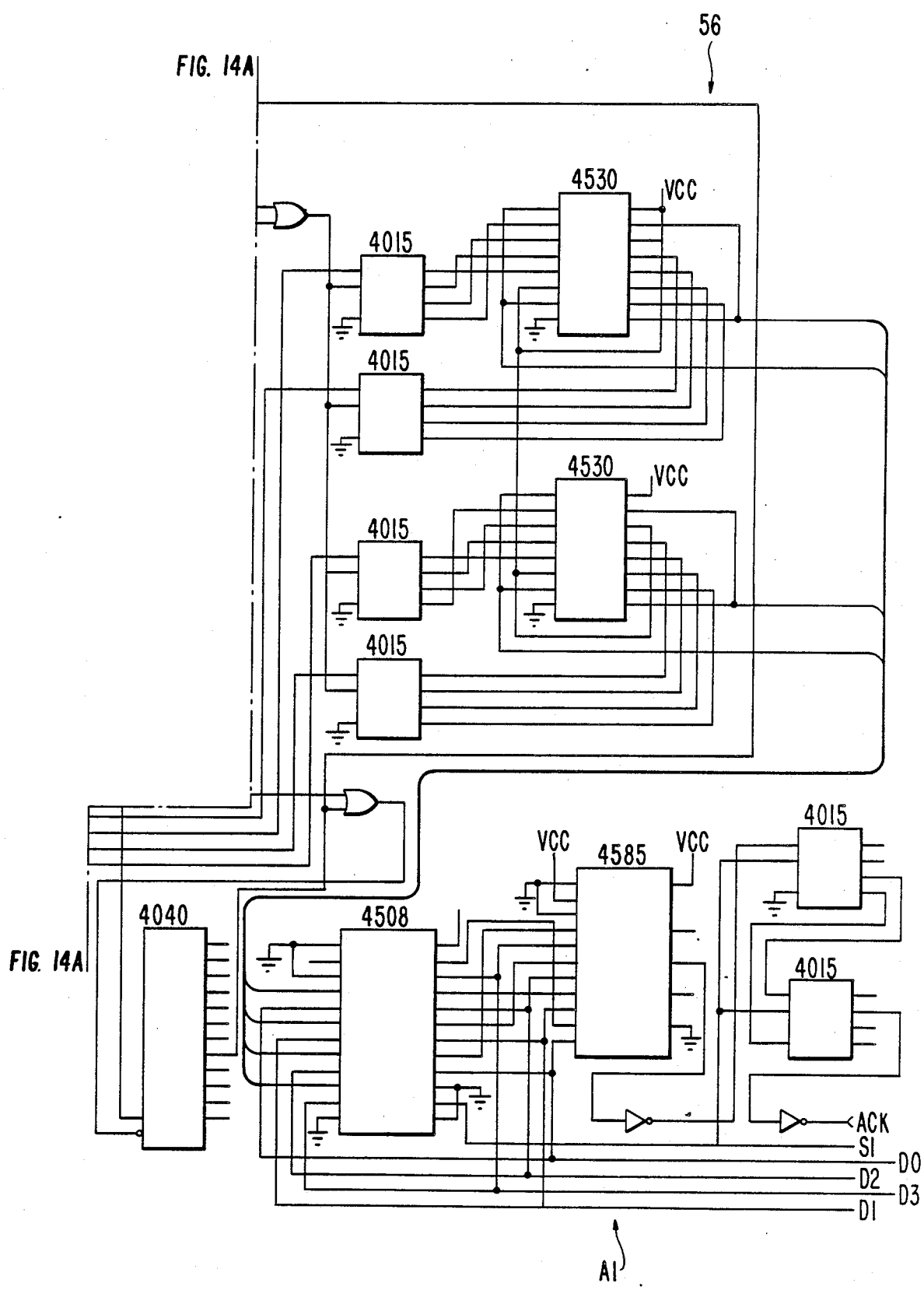
Figure 15A:
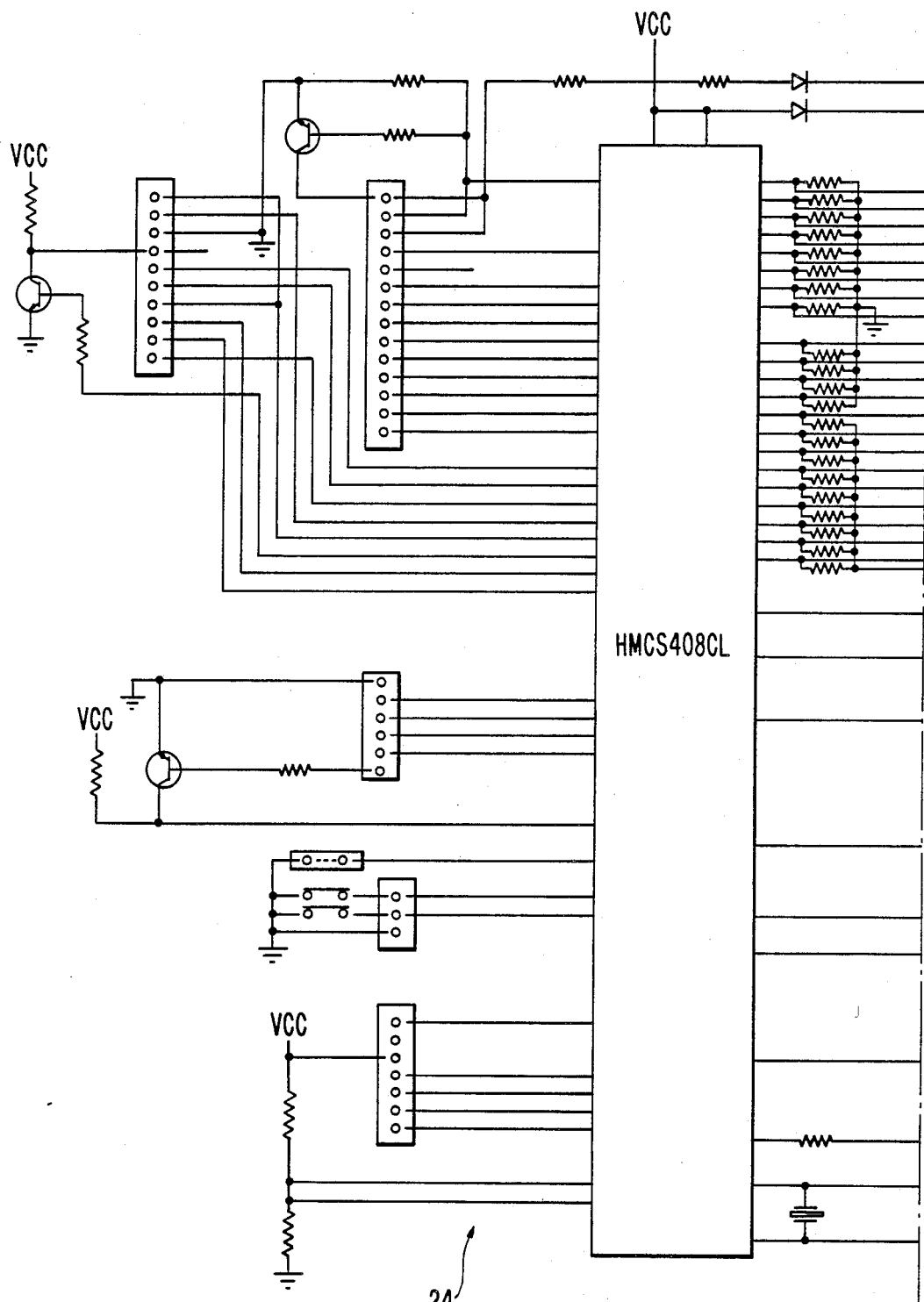
FIGS. 15A-B are a circuit schematic of the main CPU 24 of FIG. 1.
Figure 15B:
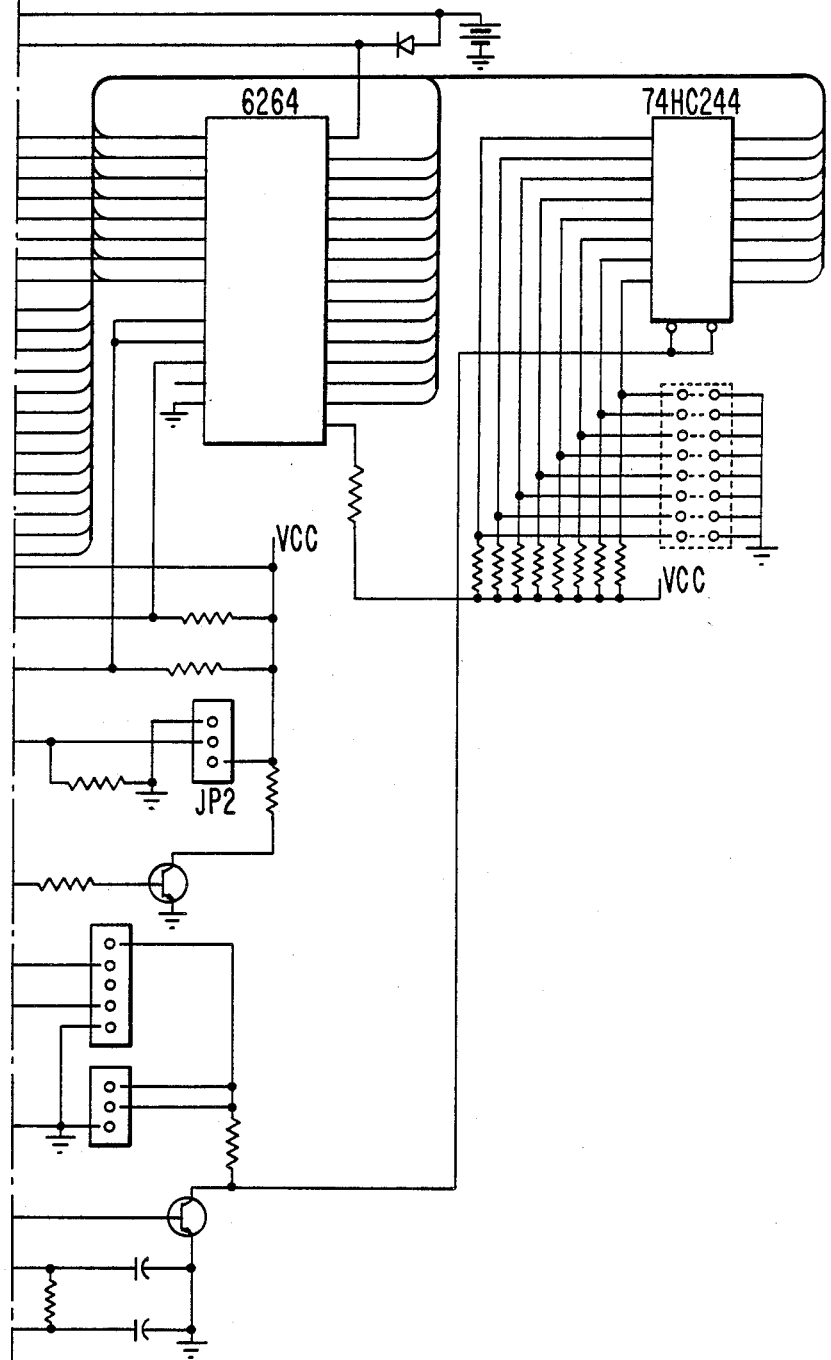
Figure 16:
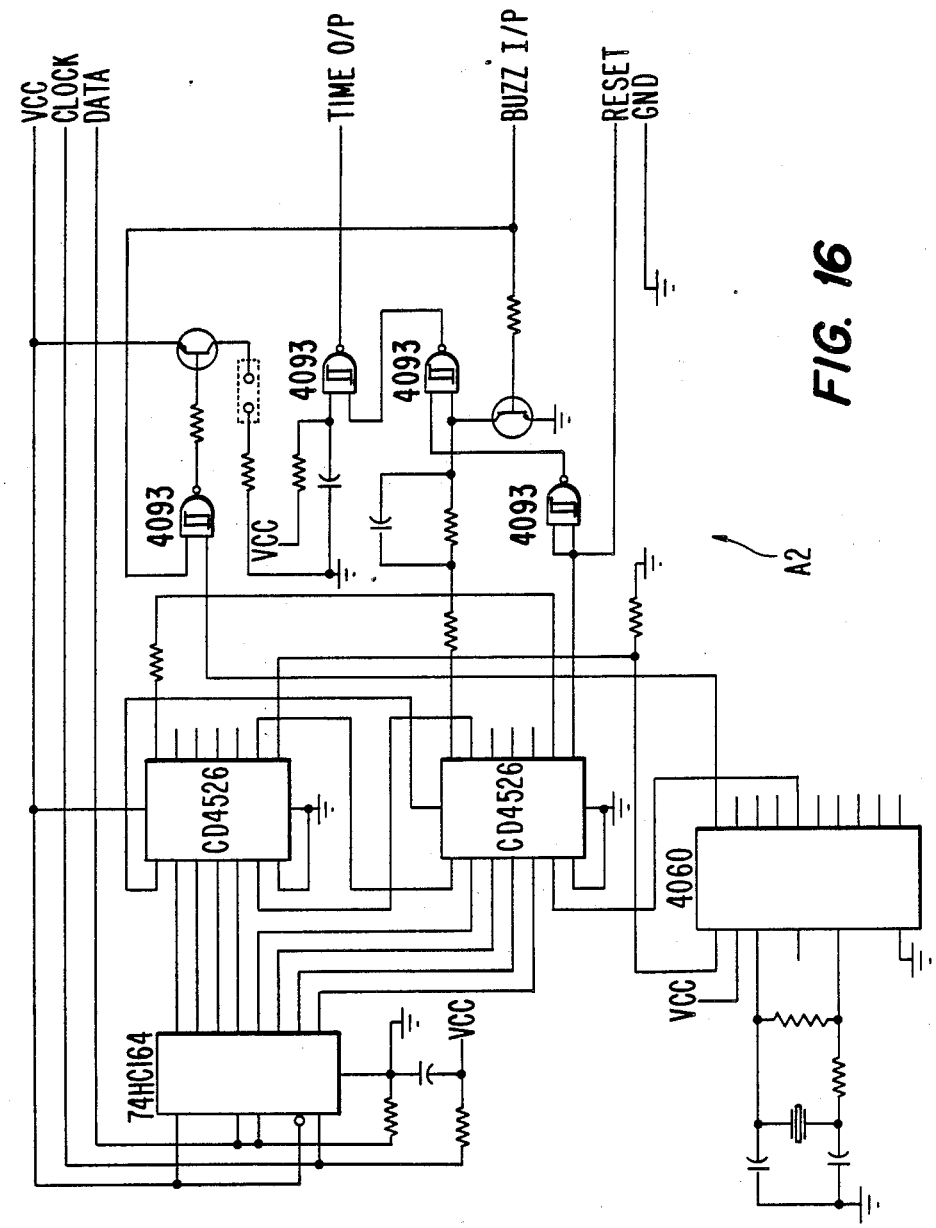
FIG. 16 is a circuit schematic of the ASIC circuit A2 of the antenna controller 44 of FIG. 1.
Figure 17:
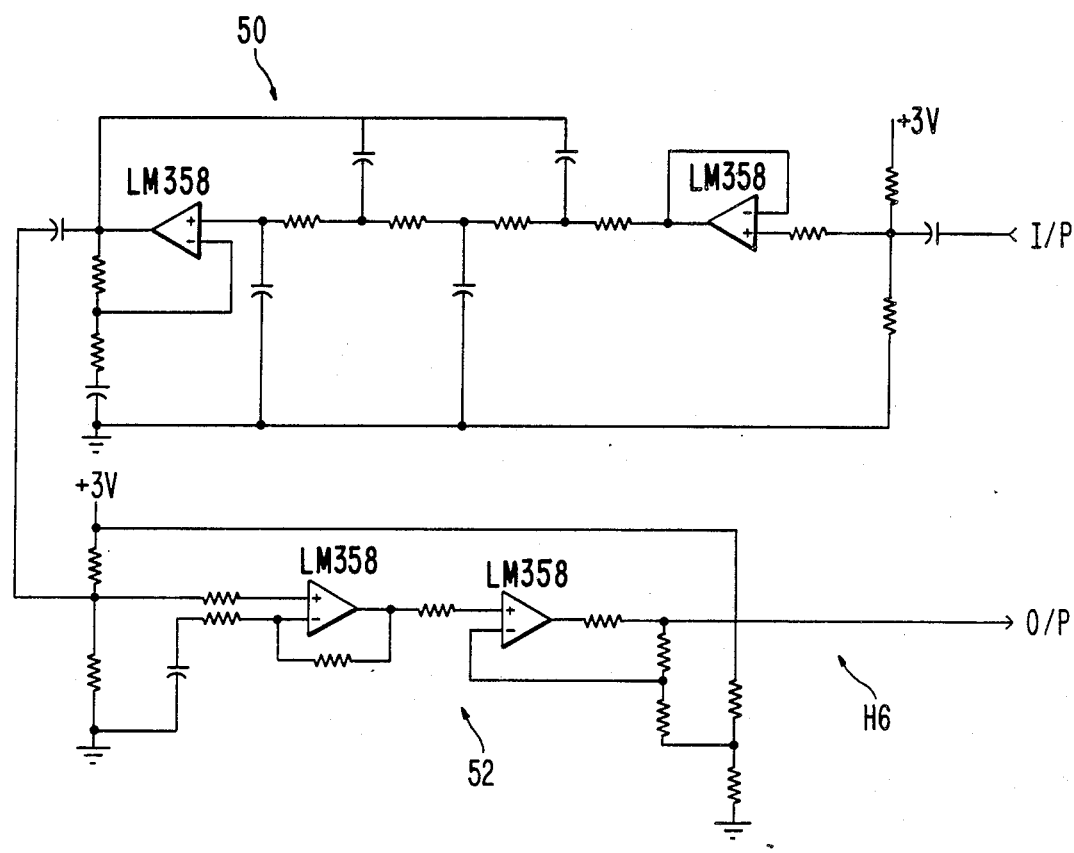
FIGS. 17 is a circuit schematic of the buffer amplifier 50 and low pass filter 52 of FIG. 1.
Figure 18:
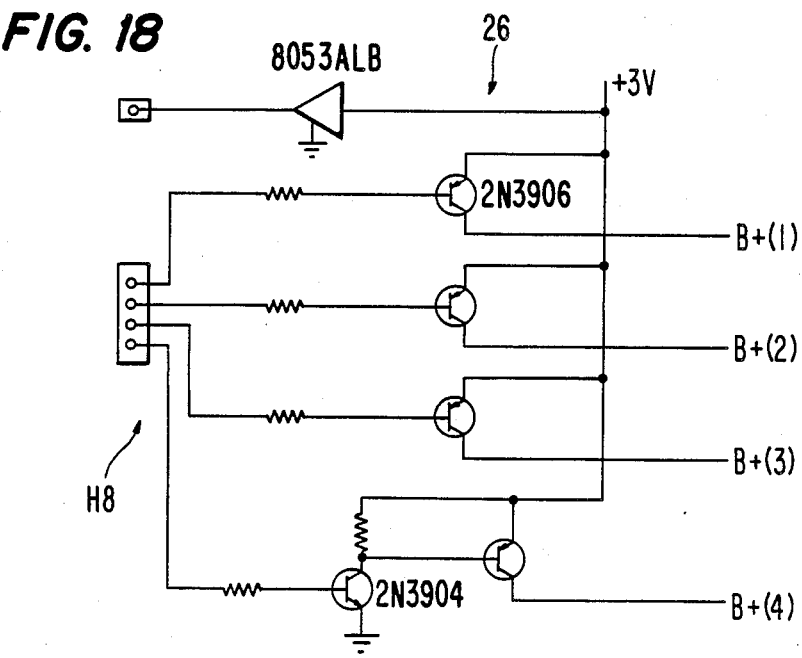
FIG. 18 is a circuit schematic of the power controller 26 of FIG. 1.
Figure 19A:
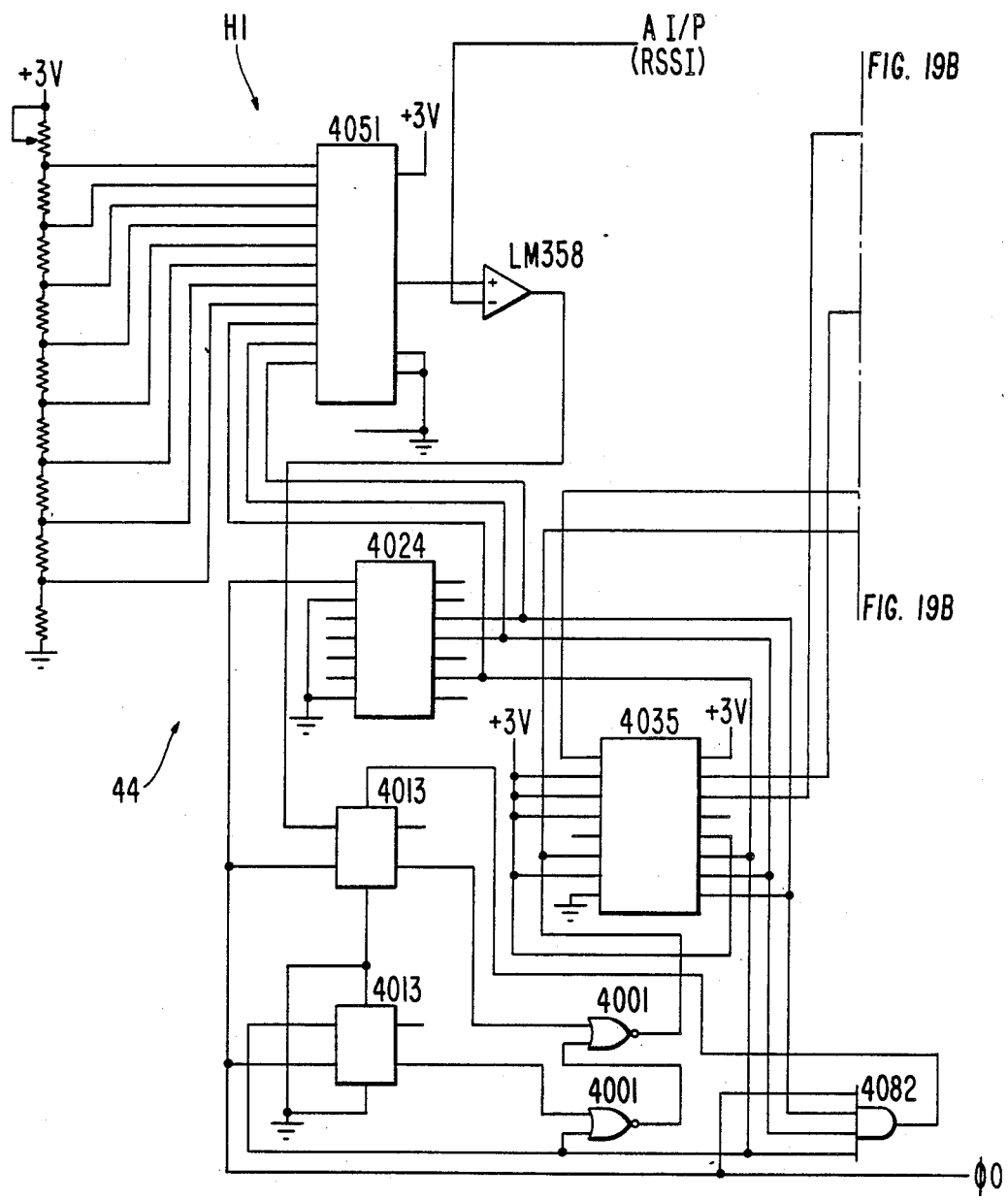
FIGS. 19A-B are a circuit schematic of the antenna controller 44 of FIG. 1 without the ASIC circuit of FIG. 16.
Figure 19B:
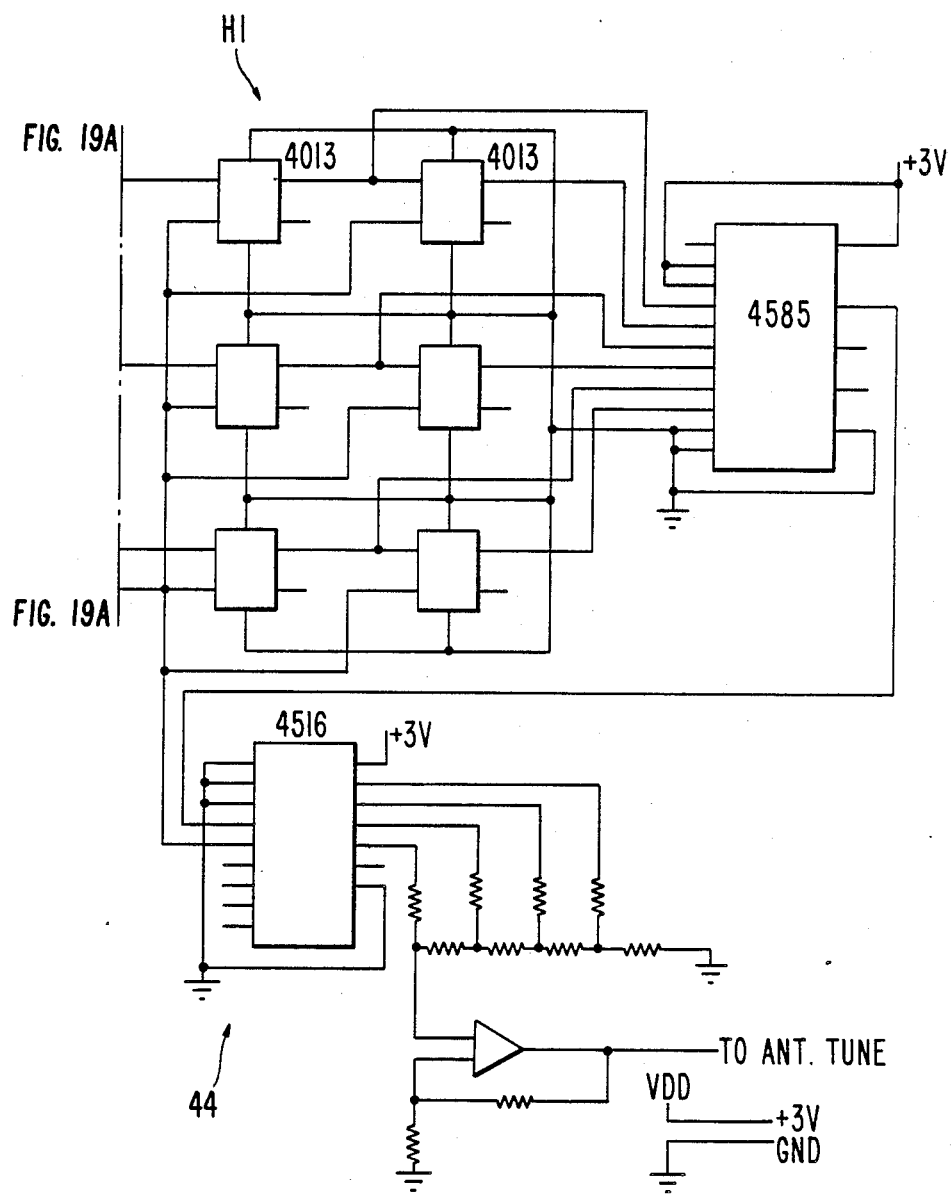
Figure 20:
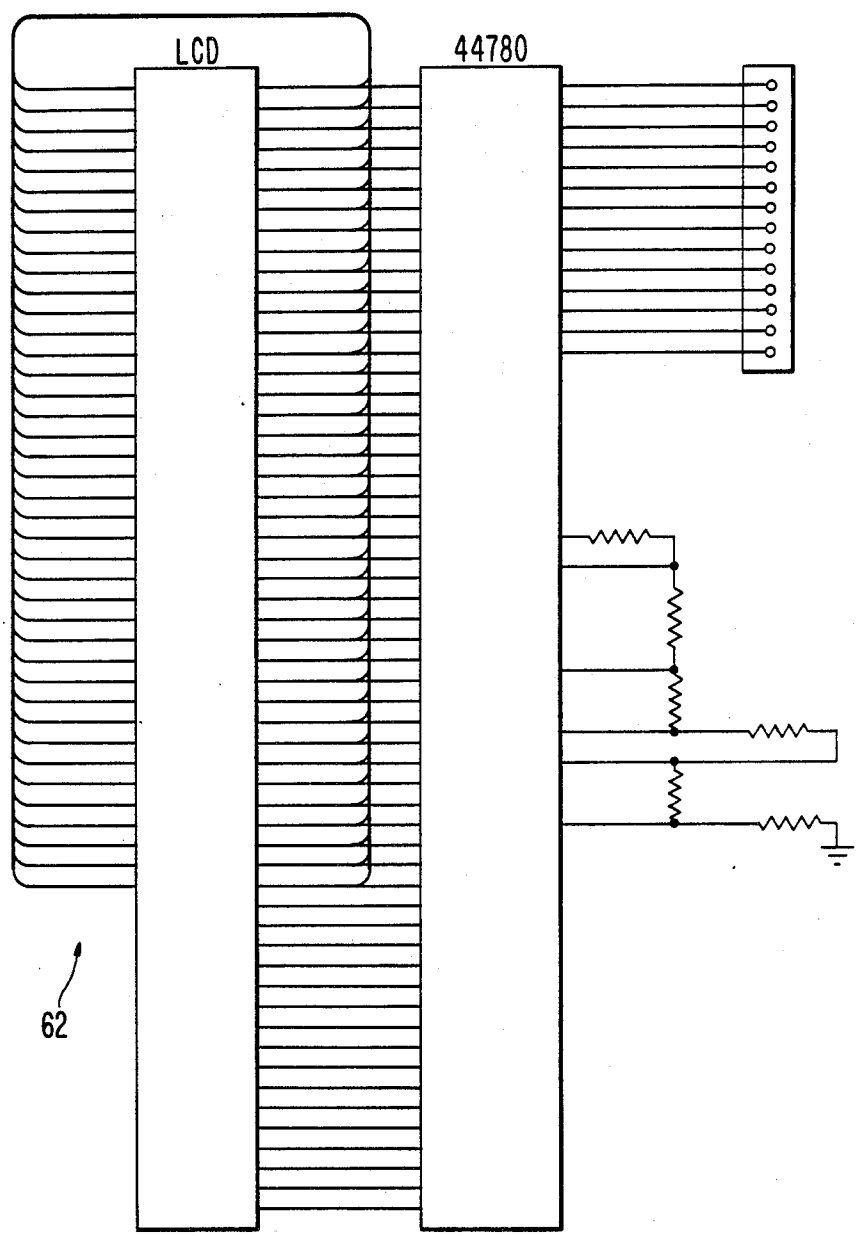
FIG. 20 is a circuit schematic of the LCD display driver 62' of FIG. 1.

FIG. 1 illustrates a block diagram of paging receiver 10 in accordance with the invention. Actual circuits for implementing the various blocks of the block diagram of FIG. 1 are set forth below in FIGS. 7-20. Additionally, the main control program for the main CPU 24 is set forth in the above-referenced Appendix. An internal antenna 12 functions to receive a total of 10,600 possible channels from the three discrete frequency bands referred to above in the Description of the Prior Art. Because of the large number of possible channels which may be received in the distinct three frequency bands, the antenna 12 has a broad band characteristic. In the paging receiver of the present invention, the antenna 12 is designed to be resonant as close as is reasonably possible in all of the three frequency bands which it is designed to receive. In other words, an optimum impedance match is desired. However, the effects of the environment in which the antenna 12 is disposed during operation (a paging receiver is typically clipped to the belt of a person) cause a variation in the degree of resonance as a consequence of variable inductance and capacitance caused by a person's body, etc. in the environment of the antenna. Thus, the gain of the antenna 12 is subject to substantial variation as a consequence of the person on which the pager is located and the physical environment in which the pager is located both of which can substantially degrade the gain of the received page applied to antenna circuit 14. The antenna circuit 14 is a tuner containing variable capacitance diodes to which is applied an ANTENNA TUNING SIGNAL to maximize the gain of the antenna 12 for the particular channel frequency that RF tuner 16 is tuned to receive. A circuit schematic of the antenna circuit is illustrated in FIG. 7. The antenna circuit 14 is tuned by the ANTENNA TUNING SIGNAL which functions to tune the antenna 12 to achieve maximum gain in a manner described below in detail. The RF tuner 16 is comprised of three separate radio frequency amplifiers and mixers 18, 20 and 22 which respectively receive UHF and 280 MHz VHF and VHF frequency bands. A circuit schematic of the UHF amplifier and mixer circuit 18 is illustrated in FIG. 8; a circuit schematic of the 280 VHF amplifier and mixer circuit 20 is illustrated in FIG. 10; and a circuit schematic of the VHF amplifier and mixer circuit 22 is illustrated in FIG. 9. Only one of the amplifiers and mixers 18, 20 and 22 is energized during reception of any of the channels which cuts down on power consumption. A main CPU 24 controls the activation of a power controller 26 which selectively activates one of the amplifier and mixer circuits 18, 20 and 22 depending upon in which of the UHF, 280 VHF and VHF frequency bands a page is to be received. The digital RECEIVER TUNING SIGNAL outputted by the main CPU 24 specifies one of the 10,600 possible channels to be received by the preferred embodiment which are stored in ROM 58 as discussed below. The RECEIVER TUNING SIGNAL is applied to phase lock loop 28 which frequency locks voltage controlled oscillator 30 on the particular channel specified by the RECEIVER TUNING SIGNAL. When a particular channel is to be received by the RF tuner 16, the main CPU 24 digitally commands the power controller 26 to activate a particular one of the amplifier and mixer circuits 18, 20 and 22 which is to receive the channel to be received. By deactivating the remaining two amplifier mixer circuits power is conserved over that which would be consumed if all three amplifiers and mixer circuits 18, 20 and 22 were simultaneously activated. A circuit schematic of the main CPU 24 is illustrated in FIG. 15 with a suitable control program contained in the above-referenced Appendix; a circuit schematic of the power controller circuit is illustrated in FIG. 18; a circuit schematic of the phase lock loop circuit 28 is illustrated in FIG. 12; and a circuit schematic of the voltage controlled oscillator 30 is illustrated in FIG. 11. The voltage controlled oscillator 30 produces an output frequency which is mixed with the signal being received by one of the amplifier and mixers 18, 20 and 22 to produce a 21.4 MHz output signal. The 21.4 MHz output signal is filtered by a 21.4 MHz filter 32. The output of the 21.4 MHz filter 32 is applied to an IF processing signal circuit 34 to produce the IF signal of 450 kHz. The output signal from the mixer oscillator 36 is applied to an IF amplifier 38 which amplifies the IF signal to a level sufficient for discrimination by FM discriminator circuit 40. A RSSI circuit (received signal strength indicator) 42 produces an output signal having a magnitude directly proportional to the level of the output signal from the discriminator 40. A circuit schematic of the IF processing circuit 34 is illustrated in FIG. 13. The RSSI signal outputted by the RSSI circuit 42 is applied to an antenna controller circuit 44. The antenna control circuit 44 contains an analog-to-digital converter 46 which converts the analog RSSI signal into digital format suitable for processing by a dedicated ASIC microprocessor. The antenna controller 44 contains an ASIC microprocessor based control circuit which executes a computer program contained in a ROM in the ASIC circuit. The ASIC circuit functions to produce a wobble signal which is outputted as a variable digital value which is applied to digital-to-analog converter 48 to produce the ANTENNA TUNING SIGNAL having a variable analog value which cause the antenna circuit 14 to be tuned variably through a frequency band for the purpose of continually locking on the point of maximum gain as a channel is being received. The variation in signal amplitude caused by the wobbling of the tuning frequency of the antenna circuit 14 is detected by the RSSI circuit 42 so that the antenna controller circuit 44 continually outputs an ANTENNA TUNING SIGNAL which tunes the antenna circuit 14 to achieve maximum gain for the antenna 12. The ANTENNA TUNING SIGNAL compensates for environmental factors which change the gain of the antenna 12 during reception such as variable inductance and capacitance caused by a person's body. A circuit schematic of the antenna controller 44 is illustrated in FIG. 16. The discriminator circuit 40 outputs either no signal (level F) or one of fifteen discrete sinusoidal frequencies each of which encodes a different signal value received from either an analog or digital FM paging receiver transmitter as described below. A buffer amplifier 50 amplifies the sinusoidal output signal from the discriminator circuit 40 to a level to create a square wave having a period equal to the period of the sinusoidal signal outputted by the discriminator 40. The square wave outputted by the buffer amplifier 50 is filtered by low pass filter 52 to attenuate frequencies below 400 hertz. A circuit schematic of the buffer amplifier and low pass filter is illustrated in FIG. 17. The output of the low pass filter 52 is applied to high pass filter 54 which attenuates frequencies above 3000 hertz. A tone decoder circuit 56 converts the discrete tones contained within the 400 to 3000 hertz pass band defined by the low pass filter 52 and high pass filter 54 as described below in FIG. 3 to produce an output level signal indicative of 16 possible levels. The main CPU 24 processes successive coded transmissions of data by combining them into a two-digit decimal number and decoding the two-digit number into alphanumeric characters. A table correlating the decimal values with their corresponding characters is set forth below. The control program for the main CPU 24, set forth in the Appendix referred to above, is stored in ROM 58. The ROM 58 also stores the possible channels which may be received, which in the preferred embodiment are 10,600, a command structure table used for decoding each of the commands discussed below, as well as the display control for the LCD display 64. Variable data is stored in RAM 60. The RAM 60 has separate memory sections for storing pages including specific memory sections which are addressable by command, the channels which are programmed to be received by the channel programming command including any destination code for restricting the place of reception of pages or a group of paging receivers to receive a page in a geographical area in a channel memory and the paging receiver identification. In the preferred embodiment there are 15 separate memory sections which store pages with sections 11-14 being addressable by command and sections 1-10 and 15 not being addressable by command. The main CPU 24 controls a liquid crystal display driver circuit 62'. A circuit schematic of the liquid crystal display driver is illustrated in FIG. 20. The liquid crystal driver circuit 62' drives a liquid crystal display 64' described below in FIG. 3. An external data port 67 is used to relay the output signal from the discriminator 52 to another data processing or storage device when the main CPU 24 executes an external data command discussed below. A port 68 is coupled to the main CPU 24 for driving an external printer. A port 69 is provided for establishing necessary communications between the main CPU 24 and an external printer. A display switch 70 is used for activating the display 64'. A light switch 71 is used for activating back lighting of the display 64'. The switches 70 and 71 may also be used for inputting data when suitable displays are made on the display 64' by the control program of the main CPU 24. Port 72 is connected to the paging receiver battery (not illustrated) for providing power. Port 73 is provided for activating an audio alarm contained in the paging receiver and port 74 permits connection to an external antenna which may be used when the paging receiver is connected to an external device such as a printer.

A commercial embodiment of the paging receiver 10 illustrated in FIG. 1 has 10,600 discrete channels stored in ROM 58 from the three discrete bands which may be received by the amplifier and mixers 18, 20 and 22 as described above. The main CPU 24 is responsive to a channel programming command, described below with reference to the commands which the main CPU 24 executes, to dynamically tune the RF tuner 16 to discrete channels. Each channel programming command is decoded by the main CPU 24 to extract a channel from the 10,600 possible channels stored in ROM 58, to be stored in a channel memory section 62 of the random access memory 60 described below with reference to FIG. 2.

II. Channel Memory

Figure 2:
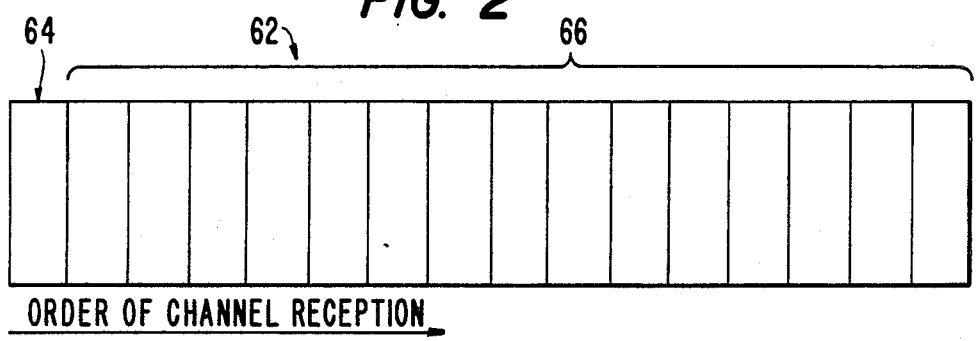
FIG. 2 is a diagram of the channel memory used for storing channels to be received.

FIG. 2 illustrates the channel memory 62 which is comprised of an operating channel section 64 storing a single channel and an area channel section 66 storing up to 15 discrete channels to be scanned sequentially by the RF tuner 16 under the control of the operating program of the main CPU 24. Illustrated below the operating channel section 64 and the area channel section 66 is an arrow indicating the order of channel reception by the RF tuner 16 when channels are being scanned to detect a carrier. The control program of the main CPU 24 changes the channel stored in the operation channel section 64 to automatically have the channel of the last received carrier received by the RF tuner 16 stored therein. The channel stored in the operation channel section 64 is one of the channels that the channel memory 62 of the RAM 60 has been programmed to receive by the channel programming command. It should be understood that while 15 possible channels may be stored in the area channel section 66, it is only required that the area channel section 66 be programmed with only one channel which is typically the case when the paging receiver is to operated locally to receive only a single channel. In that case, the operating channel section 64 automatically stores the only channel that the RF receiver 16 will receive upon activation by the main CPU 24 and reception of the carrier signal. Furthermore, it should be understood that any number of channels may be utilized in practicing the invention. Each time the control program of the main CPU 24 outputs a channel from the channel memory 62 to be received by the RF tuner 16, the main CPU 24 applies the RECEIVER TUNING SIGNAL in the form of a digital signal to the phase lock loop 28 which activates the voltage controlled oscillator 30 to produce a 21.4 MHz signal from the single activated amplifier and mixer circuit 18, 20 and 22. The control program of the main CPU 24 analyzes the signal which is outputted from the channel memory 62 and applies a control signal to the power controller 26 which selectively applies power from the power circuit 66 to only the particular one of the RF amplifier and mixers 18, 20 and 22 which is to receive the channel specified by the RECEIVER TUNING SIGNAL thereby saving power consumption of the battery.

The individual channels of the area channel section are programmed at the time that the paging receiver identification code is sent to the paging receiver identification code memory described below, when the pager is issued to a customer, and further are also reprogrammed when the customer desires to "roam" to another service area such as during business travel in which it may be desired to receive pages on the same channels that the paging receiver is currently programmed to receive in which case a destination code will be added by the channel programming command or to receive different channels in which case different channels will be programmed. The programming of channels may also be accomplished dynamically during local paging to switch the paging receiver to channels which are not as busy as a channel that the paging receiver is currently programmed to receive. As is apparent from FIG. 2, during channel scanning for the purpose of finding a channel on which at least one carrier is present, channels to be received are selectively outputted from the operating channel section 64 first and then from the successive section 66 of the area channel section. Each of these frequencies causes the phase lock loop 28 to lock the voltage controlled oscillator 30 to a frequency necessary to produce the 21.4 megahertz signal from the activated RF amplifier and mixer circuits 18, 20 and 22 which is to receive the particular channel frequency. The control program causes the channel which is stored in the operating channel section 64 to be cyclically received for a predetermined time interval, such as but not limited to 15 minutes, by activating the RF tuner 16 once every 900 milliseconds, or other appropriate channel, to sample the channel for the presence of a carrier signal and if carrier signal is present to compare the paging receiver identification code discussed below transmitted with the page in the order of increasing significance of the digits until a mismatch between the transmitted paging receiver identification code digits and the digits of a paging receiver identification code stored in the random access memory 60 is detected at which time the RF tuner 16 is shut off to conserve power.

Figure 3:
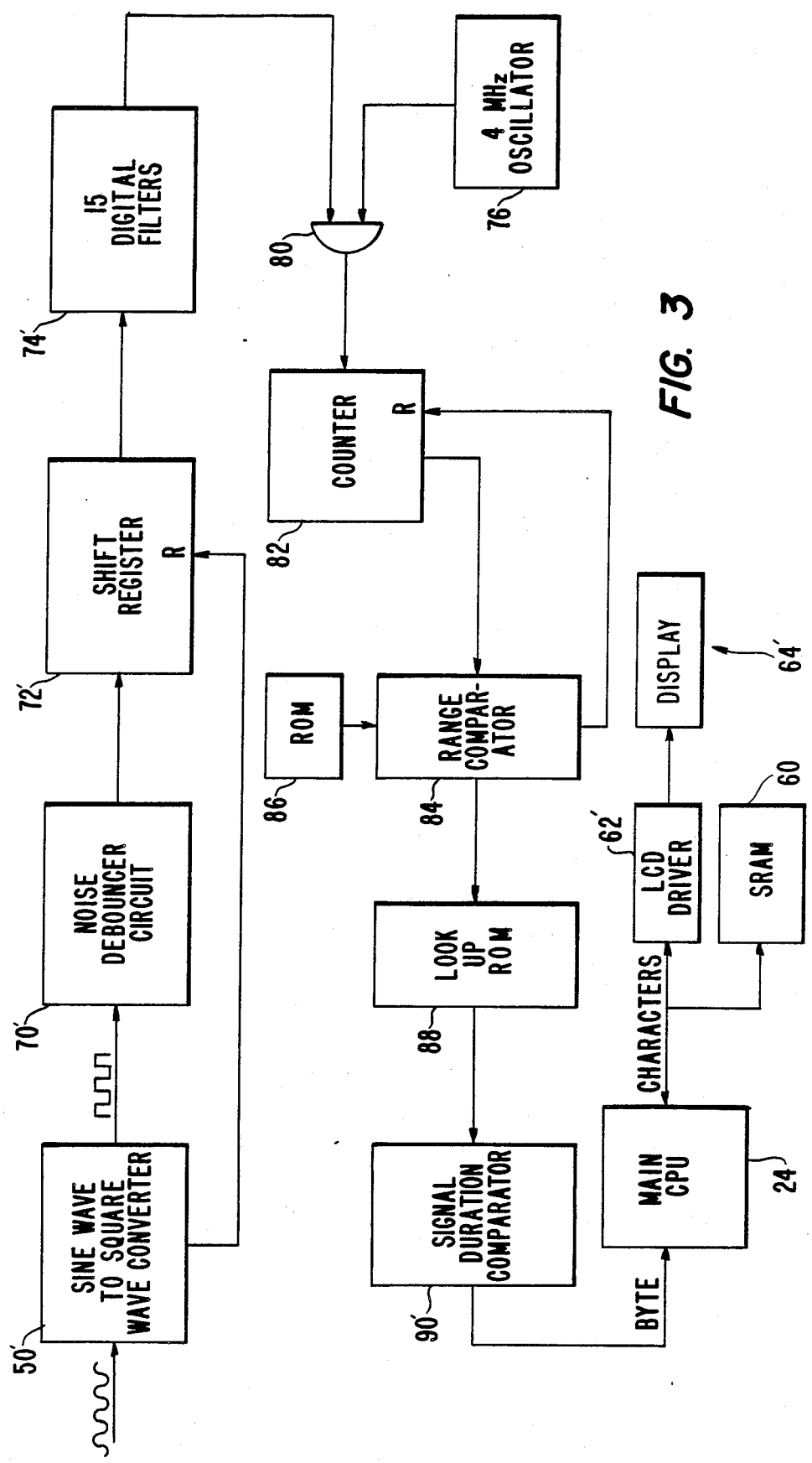
FIG. 3 is a functional block diagram of the operation of a paging receiver in accordance with the present invention in processing signals from analog and digital transmitters.

III. Universal Reception of Pages From Either Analog or Digital Transmitters FIG. 3 illustrates a detailed block diagram of the buffer amplifier 50, low pass filter 52, high pass filter 54 and tone decoder 56 of the present invention for universally processing signals transmitted from either analog or digital FM paging transmitters. The preferred form of the signal protocol of the present invention utilizes the following tones to encode 16 discrete signal values as stated in a hexadecimal numbering system as follows: 600 Hz.=0; 741 Hz.=1; 882 Hz.=2; 1023 Hz.=3; 1164 Hz.=4; 1305 Hz.=5; 1446 Hz.=6; 1587 Hz.=7; 1728 Hz.=8; 1869 Hz.=9; 2151 Hz.=A; 2435 Hz.=B; 2010 Hz.=C; 2295 Hz.=D; 4059 Hz.=E; and no tone (absence of modulated carrier signal)=F. Any existing analog FM paging transmitter can be used to output a carrier wave having a frequency which is frequency modulated with the above-described tones. Similarly, any existing digital FM paging transmitter can be used to output a square wave signal having a period modulated with the above-described frequencies encoded thereon. The output from the frequency discriminator 40 is applied to a sine wave to square wave converter 50' which amplifies the sinusoidal input signal to convert it to a square wave having a period equal to a period of the sinusoidal input signal. The output of the sine wave to square wave converter is applied to a noise debouncer circuit 70' which removes jitter from the input square wave signal to provide precise period information on its output. The output from the noise debouncer circuit 70' is applied to a shift register 72' having a number of stages requiring a predetermined time duration of the input square wave outputted by the noise debouncer circuit 70' to be applied to produce an output. The shift register 72' is reset each time the signal level from the sine wave to square wave converter 50' is zero or changes frequency. The function of the shift register 72' is to eliminate transient signals which are not valid signal levels. The number of stages is chosen to be sufficient to produce an output when an actual tone used for encoding valid information is received while blocking transmission of invalid transient shorter duration tones. Output signals having a duration less than the time required to fill up the shift register 72' are not applied to a group of 15 digital filters 74'. Each of the digital filters has a pass band centered around a different one of the tones set forth above. When a square wave having a frequency falling within the pass band of any one of the fifteen digital filters is applied to the fifteen digital filters 74', an output square wave signal is produced as inputted to the fifteen digital filter from the shift register 72'. A 4 MHz. oscillator 76 applies a 4 MHz. internal reference signal to an AND gate 80 to which the output of the fifteen digital filters 74' is also applied. The high frequency of the oscillator 76 permits a large number of samples to be taken for each high level state of the output of the fifteen digital filters 74'. By providing the high level sampling frequency, it is possible to precisely determine the frequency of the fifteen tones used for encoding signal levels with a high degree of accuracy over a single cycle. The ability to detect accurately the frequency over a single cycle provides an extremely high throughput of information when a single cycle is used to encode sixteen possible data levels. The sampled output from the fifteen digital filters 74' is passed by AND gate 80 to a counter 82 which counts the number of samples of the output of the digital filters 74' which have a high state during a fixed time period of sampling by AND gate 80. The time interval during which the counter 82 counts the number of high level states passed by the AND gate 80 is not critical but should be chosen to be long enough to permit a high number of possible samples to be taken from a single cycle of the lowest frequency of the 15 tones identified above to permit a high degree of accuracy in the detection of the encoded frequencies transmitted with each page to encode character information. The output of the counter 82 is connected to a range comparator 84 which has an associated ROM 86. The ROM 86 has fifteen discrete address ranges stored therein with each address range being associated with a single one of the 15 tones. Each of the addresses within each range is addressed by a count applied from the counter 82. The range comparator 84 compares the output from counter 82 with addresses of the fifteen discrete ranges contained in the ROM 86 and passes the count from counter 82 to the look-up ROM 88 if a match occurs between the count outputted by the counter 82 and an address of one of the fifteen ranges stored in the ROM 86. If a match does not occur, the count from counter 82 is not passed to the look-up ROM 88. The range comparator 84 resets the counter 82 either upon the elapsing of the predetermined time interval during which the count from the counter 82 has been outputted to the look-up ROM 86 or when there is no match from between the count from the counter 82 and an address contained in one of the ranges stored in the ROM 86. The look-up ROM 88 outputs one of sixteen different numerical values which are representative of the sixteen possible signal values which may be encoded with each hexadecimal digit transmitted by either an analog or digital paging transmitter. The output of the look-up ROM 88 is applied to a signal duration comparator 90' which outputs one of the 16 numerical values (0–15) stored in the look-up ROM 88 to the main CPU 24 when the output of the look-up ROM is present for a duration for a time interval such as 10 milliseconds or longer. The purpose of the signal duration comparator 90' is to remove transient conditions which are not indicative of the true transmission of a hexadecimal level by an analog or digital transmitter.

The output numerical values from a signal duration comparator 90' are combined by the main CPU 24 in accordance with its operating program to produce a two-digit decimal number which is decoded to characters in accordance with the following conversion table when characters are transmitted to a paging receiver in accordance with alphanumeric commands A4 and A6 described below. The output of sequential numerical values is processed by the main CPU 24 in accordance with its operating program to produce numerical characters in accordance with numeric A3 and A5 commands discussed below.

CONVERSION TABLE

| Two Digit Address | Character |
|---|---|
| 01 | ! |
| 02 | " |
| 03 | # |
| 04 | $ |
| 05 | % |
| 06 | & |
| 07 | ' |
| 08 | ( |
| 09 | ) |
| 10 | * |
| 11 | + |
| 12 | , |
| 13 | – |
| 14 | . |
| 15 | / |
| 16 | 0 |
| 17 | 1 |
| 18 | 2 |
| 19 | 3 |
| 20 | 4 |
| 21 | 5 |
| 22 | 6 |
| 23 | 7 |
| 24 | 8 |
| 25 | 9 |
| 26 | : |
| 27 | ; |
| 28 | < |
| 29 | = |
| 30 | > |
| 31 | ? |
| 32 | @ |
| 33 | A |
| 34 | B |
| 35 | C |
| 36 | D |
| 37 | E |
| 38 | F |
| 39 | G |
| 40 | H |
| 41 | I |
| 42 | J |
| 43 | K |
| 44 | L |
| 45 | M |
| 46 | N |
| 47 | O |
| 48 | P |
| 49 | Q |
| 50 | R |
| 51 | S |
| 52 | T |
| 53 | U |
| 54 | V |
| 55 | W |
| 56 | X |
| 57 | Y |
| 58 | Z |
| 59 | [ |
| 60 | ¥ |
| 61 | ] |
| 62 | ¥ |
| 63 | ~ |
| 64 | — |
| 65 | a |
| 66 | b |
| 67 | c |
| 68 | d |
| 69 | e |
| 70 | f |
| 71 | g |
| 72 | h |
| 73 | i |
| 74 | j |
| 75 | k |
| 76 | l |
| 77 | m |
| 78 | n |
| 79 | o |
| 80 | p |
| 81 | q |

-continued
CONVERSION TABLE

| Two Digit Address | Character |
|---|---|
| 82 | r |
| 83 | s |
| 84 | t |
| 85 | u |
| 86 | v |
| 87 | w |
| 88 | x |
| 89 | y |
| 90 | z |
| 91 | { |
| 92 | \| |
| 93 | } |
| 94 | → |
| 95 | ← |
| 96 | — |
| 97 | + |
| 98 | ⌒ |
| 99 | ⍮ |

The decoded characters are applied by the main CPU 24 to the random access memory 60 in ASCII character encoding format and to the LCD driver 62' which provides power and logic for their display on the LCD display 64'. The LCD display 64' is of a dot matrix type and has a display area 64' which time multiplexes displays as follows. When a page is received, the main control program causes the display 64' to flash with the address location in memory where the page is stored. In response to the flashing of the display 64' as described above, the wearer of the paging receiver presses switch 70 which causes the location header to be displayed. The location headers are "LOCAL" indicating if the page originated in the same area where the paging receiver normally receives pages or "NATIONAL" or "REGIONAL" indicating that the page did not originate in the area where the paging receiver has received the message. In response to the location header, the wearer of the paging receiver presses switch 70 which causes the page to be displayed on display 64' which is stored in the memory area of RAM 60 which was flashed initially. It should be understood that alternatively separate display areas for the memory location header, location header, and page displays may be provided.

IV. Battery Saving

The paging receiver 16 has predetermined scanning time intervals necessary for detecting the presence of the carrier signal, the presence of individual code transmissions (tones) and to cyclically scan up to the 15 possible channels in the channel memory 62. In the embodiment of FIG. 1, the scanning time necessary to detect only the presence of the carrier of the channel is 315 milliseconds for all 15 channels which may be received if the area channel section 66 is completely programmed. It takes approximately 10 milliseconds for the phase lock loop 28 to respond to a channel to be received and another approximately 11 milliseconds for the amplifier and mixers 18, 20 and 22 to respond to the presence or absence of the channel. When a carrier is detected, it takes approximately 33 milliseconds for it to be received by the RF tuner 16 and processed by the main CPU 24 to determine its identity and to compare it with the stored paging receiver identification code as described below. When the channels of the channel memory 62 are cyclically scanned, the RF tuner 16 in the embodiment of FIG. 1 is powered up once every 900 m.s. for a period of 15 minutes at which time the reception by the RF tuner is stopped under the control program.

Each paging receiver is issued a unique paging receiver identification code. A preferred form of the paging receiver identification code is described below in FIG. 4 with reference to a memory map of the paging receiver identification code memory which is located within the random access memory 60. It should be understood that the invention is not limited to the number of digits as described below in the preferred form of the paging receiver identification code and further that is used herein "digit" means any number in any numbering base with the preferred numbering base of the present invention for paging receiver identification codes being base 10. With respect to FIG. 4, each paging receiver identification code 90 is comprised of a group of three most significant digits 92 which have regional significance and are referred to as an "area designation code". In a preferred form of the present invention, these digits are the telephone area code of the location where the person normally wearing the paging receiver resides. For international use, the country code may also be added as an area designation code. Five additional digits 94 of decreasing significance are used to distinguish each bearer of a paging receiver in the particular area identified by the area designation code 92. In a preferred form of the invention, a command is issued by the local channel transmitter to which the paging receiver is normally tuned to receive messages for programming the eight digit paging receiver identification code 90 for storage in the RAM 60. An eight digit paging receiver identification code 90 was chosen in the preferred embodiment of the present invention for the reason that it permits a total of 100,000,000 paging receivers to be uniquely identified in a base ten numbering system. In the preferred form of the present invention, while individual characters are sent by successive tone modulations of a frequency modulated carrier with sixteen possible values per frequency tone, the paging receiver identification codes are issued in a base ten numbering system for the reason that it is easier for most users to understand a base ten numbering system than a base sixteen numbering system.

Figure 4:
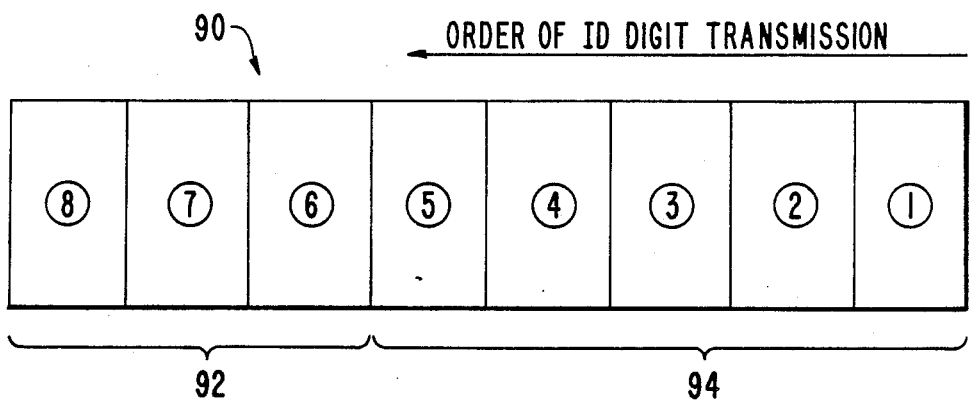
FIG. 4 is a diagram illustrating the order of transmission of the digits of the paging receiver identification code.

A significant feature of the present invention in prolonging battery life in the individual paging receiver is that the paging receiver identification code identifying the paging receiver to which a page is directed is sent with the digits in an order to increasing significance. With reference to FIG. 4, the right-most least significant digit is sent first followed by digits of increasing significance as identified by the circled numbers in each of the individual digits of the paging receiver identification code 90 and the arrow above the individual digits labelled "ORDER OF ID DIGIT TRANSMISSION". The paging receiver identification code is processed by the paging receiver in the order of increasing significance of the digits as described with respect to FIG. 4.

In a system with 1,000 paging receivers, the following example demonstrates the battery life saving achieved by the present invention for paging receivers having identification codes 93110000 through 93110999 with the present invention as contrasted with the prior art. If the paging receiver identification code digits are sent in the order of decreasing significance as in the prior art, which is the opposite of the order illustrated in FIG. 4, each paging receiver will respond to the first five digits. Assuming three pages per day, per paging receiver, the paging receiver will turn on RF tuner 16 3000 times per day. If it assumed that each cycle of turning on the RF tuner 16 consumes 300 milliseconds of on time, then each paging receiver will have its RF tuner 16 on for fifteen minutes per day. With the present invention, when the paging receiver identification code is sent in an order of increasing significance of the digits, as illustrated in FIG. 4, 900 paging receivers will immediately turn off after the transmission of the first digit because there will be no match between the first digit transmitted with the page and the stored paging receiver identification code digit as illustrated in FIG. 4. Upon the transmission of the second digit, ninety more paging receivers will turn off. Upon the transmission of the third digit nine more will turn off. With the same 3000 pages per day, the average time a pager will be on is only one minute per day. This produces a 93.4% reduction in battery consumption attributed to the turning on of the RF tuner 16 to merely determine if a page is possibly to be received on a channel to which the paging receiver has been programmed to receive. If a system is expanded to 10,000 pages, the battery savings will be increased with the on time in a system in accordance with the prior art in which the paging receiver identification code digits are sent in the order of decreasing significance being two and one-half hours per day versus only ten minutes per day of on time when the digits of the paging receiver identification code are sent in the order as described in FIG. 4 with it being assumed that the RF tuner 16 on time is the same as described above.

V. Channel Scanning

The operation of the paging receiver in turning on to detect the presence of a channel on one of the channels which it is programmed to receive and the scanning of a plurality of channels of the channel memory 62 is described as follows. Upon turning on of the paging receiver, the channel of the operating channel 64 is sampled for 15 minutes. If one of the amplifier mixer sections 18, 20 and 22 does not detect a tone frequency (a 0-9 tone of 690 milliseconds) of the operating channel section, within 15 minutes, the paging receiver will scan the channel stored in the operating channel memory section 64. If there is no detection of any receptions after the 30 minutes of scanning, the operating program of the main CPU 24 will turn off the RF tuner 16 and display on the message portion 68 of the display 64' "out of range" and activate a beeper.

In the embodiment of the invention illustrated in FIG. 1, when the paging receiver 10 is scanning the channels stored in the memory 62, it is searching for the presence of an RF carrier and the paging receiver identification code. When no carrier is present, the RF receiver 16 will turn on and detect that no carrier is present in approximately 11 m.s. of time and progresses to the next channel stored in the channel memory 62 as indicated by the "ORDER OF CHANNEL RECEPTION." When a last digit of the paging receiver identification code is detected for two consecutive on intervals of the RF tuner 16, the paging receiver will stay on that particular channel for the duration of the paging receiver identification code which spans 1912 milliseconds in the preferred embodiment. Each time carrier from one of the channels is detected or the paging receiver identification code is detected, the fifteen minute timer is reset. This allows the paging receiver to remain on a channel. The paging receiver then samples the channel once every 900 milliseconds for an 11 or 33 m.s. duration to respectively detect if carrier is present and, if so, to identify the code which was transmitted.

The full channel scanning mode of the paging receiver as described above with respect to FIG. 2 requires a sampling time on each channel of approximately 11 milliseconds to detect the carrier wave or 33 milliseconds to fully detect a code transmission depending upon the presence of a carrier signal. If no carrier is present, the paging receiver will detect the lack of a carrier within 6 milliseconds and scan to the next channel. When a carrier is detected, the pager will look for tones 0-9 during the sampling time interval of approximately 33 milliseconds. If a tone is detected, it is stored in the random access memory 60 and scanning of the channels in the full scanning mode as described with respect to FIG. 2 above is continued. When the RF receiver then again receives the same channel, a sample is taken. If a tone is still present, and it is the same tone stored in the random access memory 60 on the previous sampling interval, a match occurs with the previous digit and sampling sequentially occurs with successive digits of the paging receiver identification code until either a match is found in which case the main CPU 24 executes one of the commands described below or a match is not found in which case the RF tuner 16 is turned off and the cyclical sampling every 900 milliseconds continues.

VI. National, Regional, Remote Area, Local, Sublocal and Group Paging

When it is desired to program the paging receiver 10 to receive a fixed channel in a local area for purely local operation, programming may be accomplished manually or automatically. As used herein, "local" identifies an area identified by the area designation code 92. Automatic programming is done with the channel programming command AC with the desired operating channel being sent twice to the pager as described below. The operating program for the main CPU 24 recognizes the sequential sending of the same channel twice by a channel programming command and stores the repeated channel in the area channel section 66 and operating channel section 64. By storing only a single channel in the operation channel section 64 and the area channel 66, the paging receiver is forced to receive only a single channel which is desirable for local operation.

Nationwide, regional, remote area, sublocal and group paging by the paging receiver is programmed as follows. In order to differentiate nationwide, regional (a plurality of areas including one or more areas outside the area identified by the area designation code), remote area (an area other than the area identified by the area designation code), sublocal (a part of an area within an area identified by the area designation code) and group (one or more paging receivers located within the local area) paging from local paging, the paging signal contains a "destination code" having one or more characters which precede the paging receiver identification code that are not recognized by a paging receiver as part of a local page. This ensures that only persons to receive national, regional, remote area, sublocal and group pages will be alerted when transmission occurs. In a preferred form of the invention, the "destination code" is a letter, which is transmitted prior to the transmission of the paging receiver identification code. Paging receivers which are to receive national, regional, remote area, sublocal or group pages are programmed by the channel programming command to store a destination code as a header on the channel. Thus, on a particular channel where some pages are transmitted with destination codes, only the first digit of each page is required to be compared with the stored destination code to enable an identification by a paging receiver programmed to receive pages with destination codes if a page is potentially directed to that paging receiver. The paging receiver tuner 16 which has been programmed with a destination code immediately turns off when a match is not found between the first digit of a page on a received frequency and the stored destination code thereby saving power required to compare the following digits of the stored and transmitted paging receiver identification codes as described below.

Figure 5:
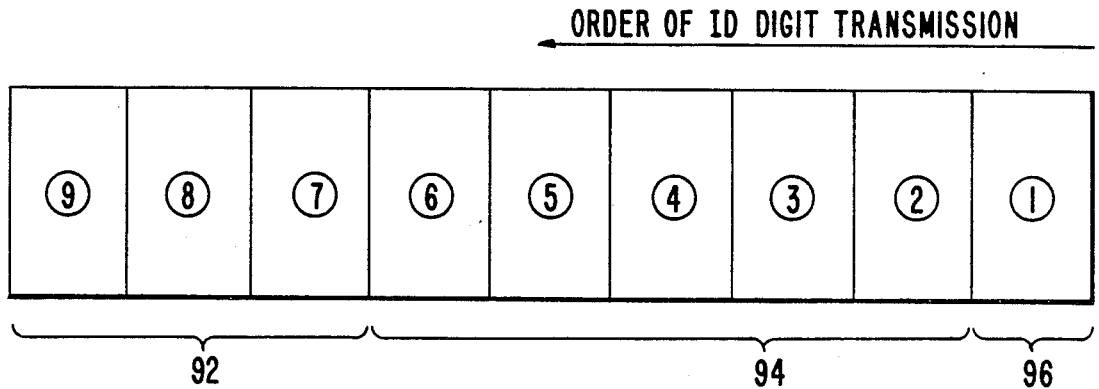
FIG. 5 is a diagram illustrating the order of transmission of a destination code and the digits of the paging receiver identification code.

FIG. 5 illustrates the order of transmission of the destination code and the digits of the paging receiver identification code for pages which are to be received with use of the destination code. Like reference numerals in FIGS. 4 and 5 are used to identify like parts. The first digit which is transmitted is the destination code 96. Thereafter the individual digits of the paging receiver identification code are transmitted in an order of increasing significance as described with reference to FIG. 4. When it is desired to program a paging receiver to receive pages with use of the destination code, the individual channels of the area channel section 66 of memory 62 are programmed by the channel programming command as described below. However, the first digit of the channels which are to be programmed to be received by the channel programming command contain the destination code 96 character such as the letter A, B, C, etc., which is not recognized as part of a paging receiver identification code, which preferably are base ten numbers. When a paging receiver receives the first digit of the paging receiver identification code, that digit is compared with the first digit of the channels stored in the area channel section 66. If a match occurs, the operating program of the main CPU 24 causes the RF tuner 16 to stay in an on state to compare the subsequent digits of the received paging receiver identification code with the stored paging receiver identification code. If there is no match between the first digit of the transmitted page and the destination code, then the paging receiver RF tuner 16 is immediately turned off to save battery power. By turning off the paging receiver tuner 16 immediately upon the detection of no match between the destination code 96, when the paging receiver is transported to a remote area its on time to receive pages will not be influenced by pages "local" to the remote area for the reason that the first digit mismatch which must occur when any page originating from an area into which the paging receiver has been transported will immediately be detected as a mismatch causing the RF tuner to be turned off.

Figure 6:
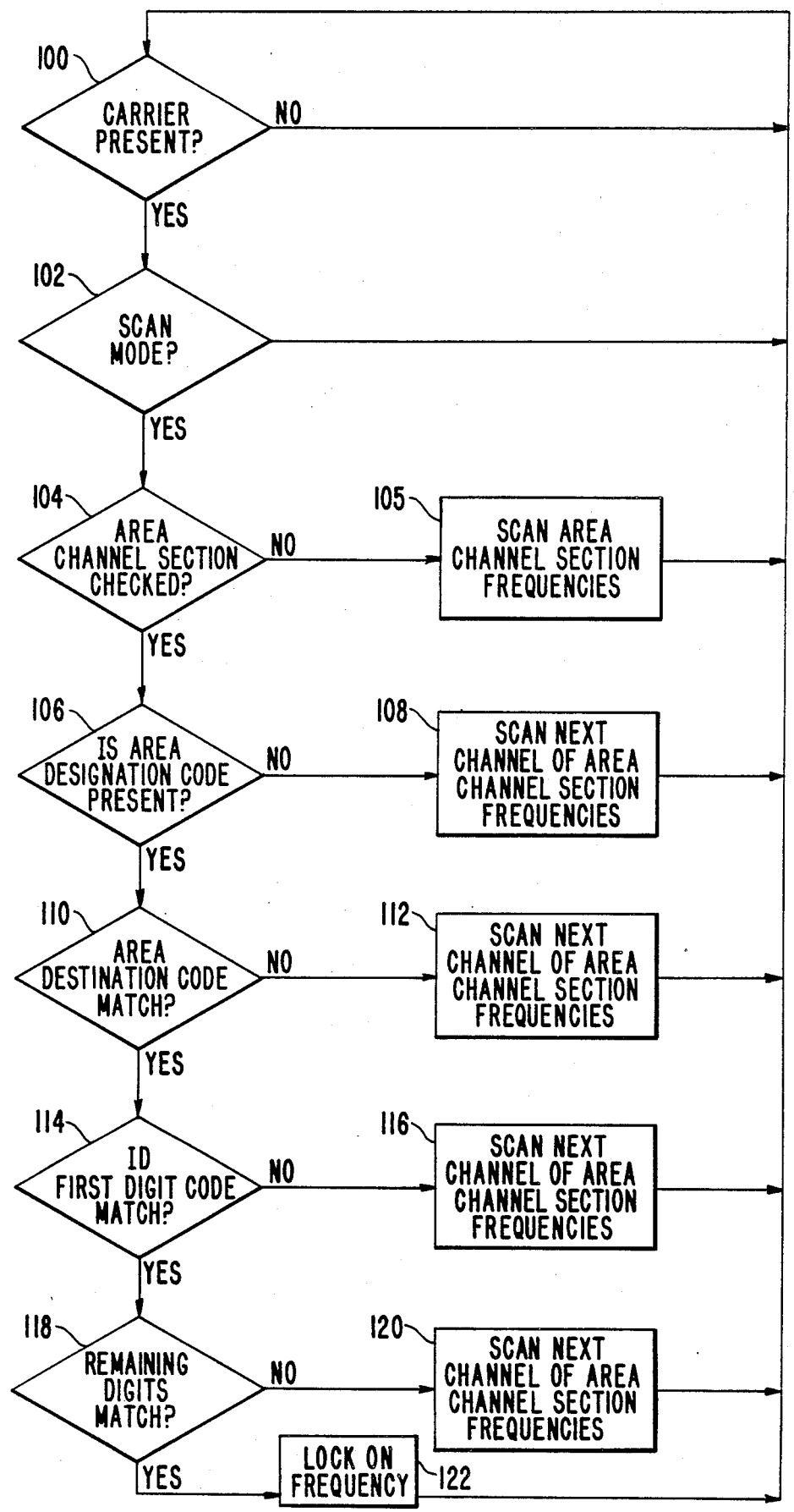
FIG. 6 is a flowchart illustrating the order of scanning the channels of the channel memory and processing of the destination code and the paging receiver identification code.

FIG. 6 illustrates a flow chart illustrating the operation of the control program of the main CPU 24 in scanning channels including the processing of pages transmitted with destination codes. The program starts at point 100 where the channel of the operation channel section 64 is scanned by the RF tuner 16. If channel frequency carrier is not present, the RF tuner 16 turns off for 900 milliseconds and then again checks if carrier is present. If carrier is present, the operating program proceeds to point 102 where a determination is made whether or not the program is in the scanning mode in which the channels of the operating channel section 94 and area channel section 96 are sequentially scanned for an interval of 30 minutes a illustrated in FIG. 2. If the program is not in the scanning mode, which is indicative of only the operation channel section channel 94 being scanned, the program proceeds back to point 100. If the answer is yes at point 102, the program proceeds to point 104 to check if the channels of the area channel section 66 have been checked. If the answer is no, the program proceeds back to point 105 where the channels of the area channel section are scanned. The program then proceeds back to point 100. If the answer is yes at point 104, the program proceeds to point 106 to determine if a destination code 96 is present on the channel being received. If the answer is no, the program branches to point 108 where the next channel in the area channel section 66 is scanned. The program proceeds from point 108 to point 100. If the answer is yes at point 106 that a destination code 96 is detected, the program proceeds to point 110 where a comparison is made between the transmitted destination code and any destination code which is stored in the channels of the area channel section 66. If the answer is no at point 110, the program proceeds to point 112 where the next channel within the area channel section 66 is received. If the answer is yes at point 110, the program proceeds to point 114 to compare the first digit of the paging receiver identification code transmitted on the channel with the stored paging receiver identification code. If there is no match at point 114, the program proceeds to point 116 where the next channel of the area channel section 66 is scanned. If the answer is yes at point 114, the program proceeds to point 118 where the remaining digits of the paging receiver identification code are compared. If the answer is no at the comparison of any one of the remaining digits of the paging receiver identification code at point 118, the program proceeds to point 120 to scan the next channel of the area channel section 66. If the answer is yes at point 118, the paging receiver locks on the channel at point 122 by setting the phase lock loop 28 to continue to receive that channel and the following command is decoded by the operating program of the main CPU 24 and executed.

VII. Commands

An important part of the present invention is the command structure which permits the functionality of the paging receiver to be changed dynamically by the transmitter in a manner not achieved by the prior art. All commands which are executed by the main CPU 24 are sent according to a protocol. An example of the paging protocol is set forth below with a nationwide telephone number page to paging receiver ID 789 12345 with telephone number 424, 6464 and a warble tone.

| FF | --5-- | B4 | BE 321 | BE 987 | A7 424 | DE 6464 | AEA |
|----|-------|----|--------|--------|--------|---------|-----|
| NOTES | 1 | 1A 2 | 2 | | 3 | 4 | 5 |

FF          provides 66 m.s. of silence prior to page.
NOTE 1    is the last digit of the paging receiver
              identification code which is sent first as
              the preamble. If the page is a group page, a
              C may be substituted for the 5.
NOTE 1A   When a "B" appears after the preamble digit,
              the person receiving the page will be alerted
              that a "batched" page is occurring to be sent to
              a group of paging receivers.
NOTE 2    The BE's are received by the paging receiver and
              ignored and provide time spacing.
NOTE 3    A7. The A signifies that a command sequence
              follows. The 7 indicates the message is
              numeric, and illuminates the nationwide origin -continued

| | display and telephone messages. |
|---|---|
| NOTE 4 | DE's are sent during the data portion of the transmission to allow overlay operation. |
| NOTE 5 | AEA or AE indicates the end of transmission and the type of alert tone to use e.g. warble. |

The operating program of the main CPU 24 is programmed to respond to a command repertoire explained as follows. A command sequence immediately follows the pager receiver identification code and always begins with a tone "A" followed by the command tone. Set forth below is a command table explaining the command structure.

COMMAND TABLE

| | |
|---|---|
| A0 | BATTERY SAVE |
| A1 | REPEAT |
| A2 | PROGRAM ID |
| A3 | LOCAL & NUMERIC (16 NUMBERS) |
| A4 | LOCAL & MESSAGE - ALPHA (511 CHAR) |
| A5 | NATIONAL & NUMERIC (16 NUMBERS) |
| A6 | NATIONAL & MESSAGE - ALPHA (511 CHAR.) |
| A7 | ALPHA FIXED MEMORY LOCATION |
| A8 | RESERVED |
| A9 | EXT DATA (OPENS AUDIO TO EXIT JACK) |
| AA | DO NOT USE! |
| AB | OUT OF SERVICE |
| AC | CHANNEL PROGRAM |
| AD | SUBLOCAL PAGERS FROM RESTRICTED AREAS OR GROUPS OF PAGING RECEIVERS |
| AE | DO NOT USE! |

A0 Battery Save

The battery save command is followed by a two digit decimal format indicating how many seconds the paging receiver should sleep before beginning its channel sampling. It is followed by an AE message terminator with no tone alert necessary. The two digit number represents the number of 10 second increments to sleep with a maximum of 990 seconds (16.5 minutes).
A022AE=220 second sleep period
A099AE=990 second sleep period

A1 Repeat Page

The repeat command indicates that the page being sent is a repeat of the previous page. The previous message display will be used, and the numeric or alphanumeric page should match a previous page which has been stored in the random access memory 60 during the execution of the A3-A6 commands which cause a page to be stored in the random access memory. If a page match is detected by the paging receiver, the page is discarded. If the first page was not received, the page should be stored in the random access memory 60 and the wearer of the paging receiver alerted. The status display will show "RPT" indicating a repeat page and the first page was not found in memory, i.e.,
A1, A3 424DE6464AE REPEAT 424-6464 (local, numeric, which is the execution of command A3 described below)

A2 Program ID

The program ID command is used to send a new paging receiver identification code to the paging receiver. The previous paging receiver identification code will be overwritten by this command. No tone alert is necessary, but the paging receiver should display the new paging receiver identification code as a page, i.e.,
CHANGE 789 12345 TO ID 789 45678 A2789DE456-7DE8AE (NEW ID)

A3 Local & Numeric (16 Digits)

The A3 command sequentially illuminates the display 64', indicating the page is of local origin, and a numeric telephone number display as a page. This command is used by a local transmitter to transmit pages originating within the area identified by the area designation code. The main CPU 24 will receive and decode the page accompanying the A3 command with characters of the page being decoded in a single digit format, e.g.
A3956DE1030AE TEL # 956-1030
The maximum numeric message length is 16 digits.

A4 Local & Alphanumeric (511 Characters)

The A4 command sequentially illuminates the display 64' indicating the page is of local origin and an alphanumeric display as a page. The alphanumeric format is sent with each character being encoded as a two digit number 01-99 as explained above. The main CPU 24 will receive and decode the page accompanying the A4 command with each character being decoded as two successive digits. The message length will be 511 characters or less. This command is used by a local transmitter to transmit pages originating within the area identified by the area designation code 92.

The message length when in the alphanumeric mode will be 511 characters in length. The display will flash, indicating the message is 511 characters long, i.e.,

```
IBM STOCK $124 3/4
(18 CHARACTER MESSAGE)
A4 73 66 DE 77 32 DE 83 84 DE 79 67 DE 75 32 DE 36 49 DE
   1 B   M SP   S T    O C    K SP   $ 1
50 52 DE 32 51 DE 47 52 AE
 2 4    SP 3    / 4        (56 CHARACTER 1.848 SEC.)
```

A5 National & Numeric (16 Digits)

The A5 command sequentially illuminates the display 64' indicating that the origin of the page is not local and a numeric message as a page. This command is used by a local paging service, within the area identified by the area designation code, which relays a page to a transmitter located at a remote area where a paging receiver is to receive a page transmitted by the transmitter located at the remote area. The main CPU 24 will receive and decode the page accompanying the A5 command with characters of the page being decoded. The main CPU 24 will receive and decode the page accompanying the A5 command with characters of the page being decoded in a single digit format, e.g.,
TEL # 956 1001 A6956DE10E1AE (NOTE: REPEAT DIGIT FOR SECOND ZERO)

A6 National & Alphanumeric (511 Char.)

The A6 command sequentially illuminates the display 64' indicating that the origin of the page is not local and an alphanumeric message as a page. This command is used by a local paging service, within the area identified by the area designation code, which relays a page to a transmitter located at a remote area where a paging receiver is to receive a page transmitted by the transmitter located at the remote area. The page which is sent in a two digit decimal order with the number field being 01-99 in the same manner as explained above. The main CPU 24 will receive and decode the page accompanying the A6 command with each character being decoded as two successive digits.

The maximum message length is 511 characters. The example is identical to the A4 command discussed above with the first two tones being A6.

A7 Alphanumeric Specific Message Memory

The A7 command permits a subset of commands to follow. The digit immediately following the A7 command will indicate in which section of addressable sections of the random access memory 60 to place the message. If a message exists in this memory location of the random access memory, it will automatically overwrite the message memory. The command subset will be 1-4 indicating memory locations 11-14. An ordinary message will not overwrite the 11-14 message locations. The message will immediately follow:

A7 1 (message location 11)
A7 2 (message location 12)
A7 3 (message location 13)
A7 4 (message location 14)

The message locations 11-14 will only be overwritten by messages with the same command (e.g. memory location 11 will only be overwritten by the A7 (1) command) or erased by the user. The message type will always be "Special Call" and will be sent as an alphanumeric message.

A8 Reserved

A9 External Data Message

The A9 command alerts the person being paged that the audio must be routed to the external data jack 67 for remote processing. The paging receiver will forward the audio to the external data jack 67 until the AE message is received, indicating end of data transmission, i.e. A9—DATA—AE.

AA Invalid

The AA command cannot be used, as it would be processed by the main CPU 24 as an AE (end of file) command.

AB Out of Service

The AB command will illuminate an out of service display on the memory section 68 of the display 64' and may or may not have numeric data following. This command may be used when system maintenance is required, or to alert the wearer of the paging service that service is being denied, until the bill is paid, i.e. ABAE (illuminates out of service message upon turn on and for two seconds).

The paging receiver still receives messages as normal. The out of range display turns on. The LCD display 64' displays "out of service" until the next page is allowed. The switching system will prevent any messages from being sent to the pager.

AC Channel Programming

The AC channel programming alerts the person wearing the paging receiver that channel programming information is forthcoming. The channels are stored in the channel memory 62 transmitted as four digit decimals numbers, each separated by the DE delimeter. As explained above, up to 15 channels may be loaded into the area channel section 66 or the operation channel section 64. A preceding V indicates VHF, a U UHF, a J indicates Japan and an E indicates Europe.

When only one channel is desired, such as for local paging, the channel is repeated at least twice, to alert the paging receiver that only one channel is desired to be programmed in the area channel section 66 of the channel memory 62. All previous channels in the area channel section 66 of the channel memory 62 are erased. The memory cells have the new channel number entered to fix the paging receiver to receive a single channel. The memory cells will remain programmed until the next channel reprogramming of the paging receiver, i.e.

---

AC0123DE0123AE (CH.V 123 NO SCANNING)
AC0E10DE0107DE0210DE1050DE7AEA (CH.v10,v107,u210,u50).
The channel programming sequence is as follows:
| | |
|---|---|
| 0001-0DDD | VHF 5 KHz steps |
| 1001-1DDD | VHF 6.25 KHz steps (Europe) |
| 2001-2DDD | UHF 5 KHz steps |
| 3001-3B2B | 280 MHz 2.5 KHz steps (Japan). |

---

Channel codes 4001, 5001, 6001, 7001, 8001, 9001 are open for additional channels to be added. The total upward reserve channel capacity in ROM 58 is 16,458 channels.

The following sub-commands are utilized for instructing the main CPU 24 to perform functions pertaining to the programming of channels.

NO Command (Add One Channel)

When no sub-command is sent, one channel is to be added to the area channel section 66. e.g. AC 0237 DE 7AEA (add VHF channel 237 to area channel section 66).

Sub-command 4000 (Typically Regional)

When 4000 is transmitted, it erases the entire area channel section 66 and the operation channel section 64 of the channel memory 62 and cannot be used in adjacent areas which must be programmed with the 6000 sub-command. e.g. AC 4000 DE 0156 DE 2132 DE 7AEA. This command erases and stored VHF 156 and UHF 132 channels in the area channel section.

Sub-command 5000

When 5000 is transmitted, the destination code may be programmed. This command erases the operating channel 64 and the area channel section 66 and forces the reception of a particular channel. The command is used for dynamic frequency agility. The paging receiver is fixed to receive a fixed channel. e.g. AC 5000 DE 0171 DE 7AEA. This command erases the operating channel 64 and the area channel section 66 and forces the paging receiver to VHF channel 171, causing the operating channel section 64 to store VHF channel 171.

Sub-command 6000 (National)

This command is divided into the loading of the 15 possible destination codes 96 and the channels.

ACB6122 DE0200 DE0000 DE0000 DE0000 DE0212 DE0311 DE0408 DE2511 DE2139 DE7AEA

This represents the 6000 national command followed by the destination code 96 or local code for each of the 15 possible channels in the area channel section. The five channels follow and will be as follows:

6122 National, channel 1=A, channel 2=B, channel 3=B
0200 Channel 4=local, channel 5=B, filler code
0000 Channel 8=11, filler code
0000 Channel 12-15, filler code
0212 VHF channel 212
0311 VHF channel 311
0408 VHF channel 408
2511 UHF channel 511
2139 UHF channel 139
7AEA Stop channel command.

Channel Programming Termination (7AEA)

The channels to be sent to the paging receiver are sent in the following order:
XXX channels (VHF) (ascending numerical order)
1XXX channels (VHF Europe)
2XXX channels (UHF Europe)
3XXX channels (280 MHz).

The last channel sent is actually a terminate message code. It is 7AEA (7AAA).

The paging receiver will receive the last frequency code and immediately terminates the page. The 7AEA terminate frequency code is necessary at the end of every AC channel program message. During the transmission of channel codes, the AEA code may appear (e.g. channel 1AEA). In order to prevent termination of the message, the AC command changes the AEA termination command to 7AEA. 7AEA is an invalid channel code.

AD Company COMMAND

The AD command allows a 32 alphanumeric character company message to be sent to the paging receiver. The message is always alphanumeric, e.g., AD 4247, DE 4637, DE 5100, DE 4833, DE 3941, DE 4639, AE Jones Paging.

When a company message is desired, it will be sent after the paging receiver identification code has been programmed. When the paging receiver is turned on, the company message will be displayed instead of a self test message which is typically used. If no company message resides in the paging receiver, the self test message will display.

The 32 character part of the random access memory 60 is battery protected to permit the message to permanently reside in the paging receiver. It may be changed by simply sending a new AD command and message to the pager. This permits the company message to be changed at will.

AE—Invalid

The AE command cannot be used, as it cannot be encoded and also conflicts with the end of file command.

End Of Page Command AE or AEA

All pages require the end of page command. The end of page command serves a two fold purpose indicating the end of transmission and determines the type of tone alert.
AE=2041 hertz—50% duty cycle—2 seconds
AEA=2041 hertz—25/75% duty cycle—2 seconds Certain commands do not send a tone alert. A listing of the commands is as follows:

| | | |
|---|---|---|
| A0 | BATTERY SAVE | (NO ALERT) |
| A1 | REPEAT | (NO ALERT) * |
| A2 | PROGRAM ID | (ALERT) - DISPLAY ID |
| A3 | LOCAL & TEL NUMERIC | (ALERT) |
| A4 | LOCAL & SP ALPHA | (ALERT) |
| A5 | NAT. & TEL NUMERIC | (ALERT) |
| A6 | NAT. & ALPHA | (ALERT) |
| A7 | ALPHA FIXED MEMORY | (ALERT) |
| A8 | UNASSIGNED | (ALERT) |
| A9 | SPECIAL & DATA AUDIO | (ALERT) |
| AB | OUT OF SERVICE | (ALERT) |
| AC | CHANNEL PROGRAM | (ALERT) |
| AD | COMPANY MESSAGE | (ALERT). |

* AL will alert if first page was not received or if previously erased.

VIII. Remote Area Paging

Figure 21:
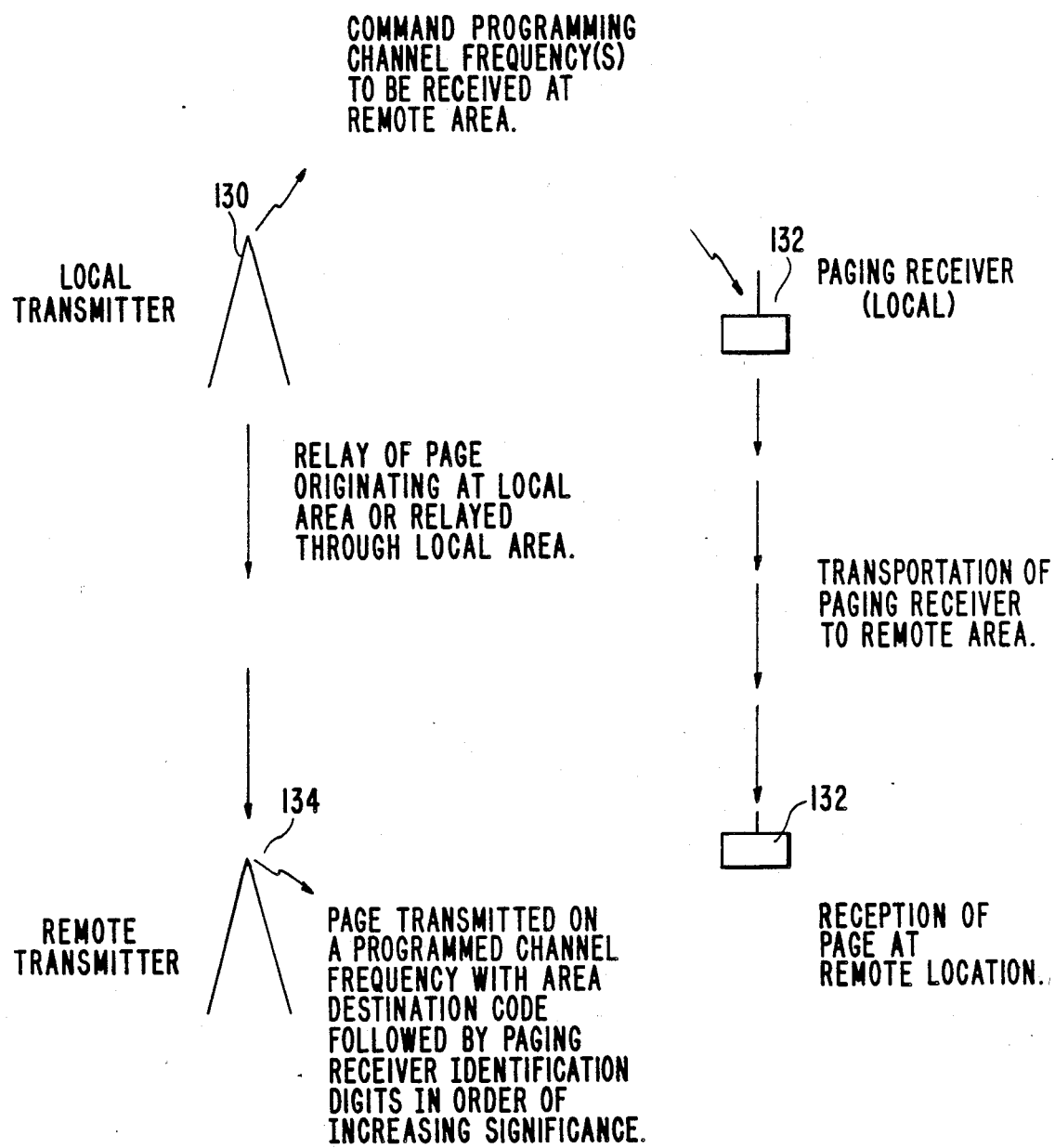
FIG. 21 illustrates the operation of the present invention in making a page to a remote area.

FIG. 21 illustrates the operation of the present invention in receiving pages at a remote area. A local transmitter 130 transmits one or more channel programming commands as described above which specify one or more channels on which a paging receiver 132 is to receive pages while located at a remote area. The channel programming commands are received by the paging receiver 132 while it is located in transmission distance of the local transmitter 130. The one or more channel programming commands specifying the one or more channels to be received in the remote location also include the destination code 96 described above used to differentiate pages to be received by the paging receiver 132 while in the remote area from pages originating in the remote area on the same one or more programmed frequencies. The paging receiver 132 is transported to the remote area as indicated by the downwardly pointing vertical arrow in the right-hand portion of FIG. 21. The downwardly pointing vertical arrow in the left-hand portion of FIG. 21 illustrates the relaying of a page originating at the local area or relayed through the local area to a remote transmitter 134 located in the remote area where the page is transmitted by transmitter 134 and received by the paging receiver 132. The remote transmitter 134 sequentially in time transmits the destination code as the first character which is transmitted, the paging receiver identification code digits in an order of increasing significance and the actual page. The paging receiver 132 while in the remote area compares the first digit of each transmission on the one or more channels that the paging receiver is programmed to receive with the stored destination code. If there is a match between the first character transmitted with a page on the one or more channels that the paging receiver 132 is programmed to page and the destination code, the paging receiver 132 compares the subsequent digits of the transmitted paging receiver identification code following the destination code in an order of increasing significance with the stored paging receiver identification code digits. The RF tuner 16 of the paging receiver is immediately turned off upon a mismatch of either the destination code or one of the digits of the transmitted and stored paging receiver identification code. If the transmitted and received destination codes and paging receiver identification codes match, the page is displayed on the display 64'. It should be noted that pages originating in the remote area will not cause the RF tuner 16 to be turned on past the point in time of transmission of the destination code because of the mismatch which will occur thereby saving the battery of the paging receiver.

A method of the present invention in paging a sublocal area within an area or a group within the local area such as a company is as follows. The paging receiver is programmed with the channel programming command to receive one or more channels. The destination code is used in the same manner as described above with regard to FIG. 21 in identifying pages to be received in a remote area except that it is assigned to paging receivers within part of the local area (subarea) or to paging receivers belonging to a group such as a company. The destination code is transmitted with the channel programming command to identify one or more channels on which pages on a sublocal or a group level are to be detected. Thereafter, the paging receiver which has been programmed to receive on the programmed one or more channels on a sublocal or a group basis compares the first digit of each transmission occurring on the one or more programmed channels to detect if there is a match between the destination code stored in the channel memory 62 and the first character which is transmitted. If there is no match, the RF tuner 16 is immediately shut off thereby saving the battery of the paging receiver. If there is a match, the paging receiver compares the transmitted digits of the paging receiver identification code in an order of increasing significance with the stored paging receiver identification code digits. If there is a mismatch between any one of the paging receiver stored and transmitted paging receiver identification code digits, the RF tuner 16 is immediately shut off. If there is a complete match between the destination code and the stored and transmitted paging receiver identification code digits, the paging receiver processes the subsequently transmitted page. Thus, it is seen that paging receivers may be programmed on a sublocal or on a group specific basis within a local area to receive pages on channels which are in widespread use in a local paging system while achieving battery savings by not turning on the paging receiver to receive subsequent digits of the paging receiver identification code for every transmission occurring on the programmed channels.

IX. FIGS. 7-20

As has been explained above, FIGS. 7-20 illustrate circuit schematics for implementing the blocks of FIG. 1. Integrated circuits are identified by their industry designation. It should be understood that other implementations of the blocks of FIG. 1 may be utilized in practicing the present invention.

X. Appendix

Each line of the hexadecimal code listing in the Appendix contains the following information as explained from left to right. The first two characters identify the start of a line which are "S0", "S1" or "S9". The two characters following the start of line characters are a hexadecimal representation of the number of bytes following on the line. The following four characters are a starting address in memory for the code following thereafter. The final two characters are a check sum for error correction purposes.

While the invention has been described in terms of its preferred embodiments, it should be understood that numerous modifications may be made thereto without departing from the spirit and scope of the invention as defined by the appended claims. It is intended that all such modifications fall within the scope of the appended claims.

APPENDIX

COPYRIGHT Telefind Inc. 1988

```
S00B0000504C4953544C2020DC
S1110000110011001410141314140000141233
S12301000A0A0013050C0600140513140000A0A0A0A00001E190C0000031D0400000A0ABA
S123012009040006000308000512120F12010000090400060003080014171001000000008
S123014003080D000000001E080F0C04000C091403080D000000001E0E1C1E000C0914006E
S123016003080D000000001E140F0013050C030003080D000000001E140F001E1A1804034B
S1230180000000000000F080010151308000409130000000000000F0B0C1F0F1C0D0004091344
S12301A000000000000E0F00080F0C04000C091400000000000E0F0E1019041E00C09142F
S12301C003080013050C05031400050E04001F000308001E1A180400001411D041E001F00C9
S12301E0190513131E10151308000409130000000019051311E0C1F0F1C0D00040913000007A
S12302000E0F1E10151308000C0914000000000000E0F1E0C1F0F1C0D000C091400000006F
S12302200F1514000F06001305121609030500001113040015 0C001B100B1E1D0000000062
S1230240000002011414000C0F170000000000000000A1E0F0318001B130000000000003D
S123026005121120F120100130512160903050100000014171001001B100B1E1D000100002F
S12302800904 1F00101513 08000409130000000009041F000C1F0F1C0D000409130000001F
S1230 2A003081F001015130800040913000000003081F000C1F0F1C0D00040913 00000 03
S12302C01303010E1F00101513080004091300001D170C1D1F000C1F0F1C0D000409130077
S12302E013010D100C05000F100512000308000003 08001B1D0C1F190015100C1F1D000083
S1230300000000C0F03010C000E150D0512090300000001B10161900051D0A1E100000000A7
S1230320 00000C0F03010C000D051313010705000 00001B10161900001211E0F011E0000 0091
S123034000000C0E040E000E150D051209030000000161E120100051D0A1E100000000079
S123036000000C0E040E000D05131301070500000000161E120100121E0F011E0000000063
S12303800000000000000000000000000000000000000000000000000000000000000000059
S12303A0090E0012010E070500000000000000090E00000A1D12000000000000000000A5
S12303C0000005181400040114010000000000000000000000000000000000000000000CE
S12303E00F1514000F06012010E0705000000000F1514000F06000A1D12000000000000F9
```

```
S12304000D05131130107051F1015130800040913121E0F011E1F000C1F0F1C0D0004091314
S123042013010D100C051F00101513080000C09141B1D0C1F191F000C1F0F1C0D000C0914C7
S12304401303010E1F0010151308000409130000lD170C1D1F000C1F0F1C0D0004091300F5
S12304600F06061F00100F170512000F060600000F06061F000A1F1C10000F0606000000002C
S12304801203160000F0606000D050D000F0B00001C1E0D1C1D000F0606001213000F0B00FF
S12304A00E051814000D1F001015130800040913021710012131F0C1F0F1C0D000409136F
S12304C005120113051F0010151308000409130004181910C001F000C1F0F1C0D0004091376
S12304E00E051814000D1F0010151308000040913021710012131F0C1F0F1C0D000409132F
S12305000090400030000000000000000000000009040003000000000000000000000000B7
S12305200D1A000000000000000000000000000000D1A0000000000000000000000000Q0069
S12305401305121609030500030F0405001B001D1B100B1E1D0000001A10041E001B001DFE
S123056000000001405131400050E040000000000000000031D040000141D041E000000A9
S12305800000000101209OE140000000F0B000000000000C01181D040000000F0B00000090
S12305A0030F0D10010E1900000D0513130107050000161210C0C000000121E0F011E0000ED
S12305C000000131000503090100C003010C0C000000001D0D1F1C01900001A101900000ED
S123060000A19040D1F180E001B0D010303080C1016040A011A040B010B11060F0400041171
S12206200400040611090F040B11090710000F00150409101C130D0B0408100E1103l268
S122063F11090F040000411131000D000D1415060A0A0B0D111A10000111B111E1001011B0B
S123065E04110C17041E041804041900D11121006051B11161007051B04110418180B0007C2
S123067E000F010C000D03170A020F12060201F1316010C000D1000020311000C13000D1329
S122069E051010141C010108010811D1100000C030D101471114101212141111203111C8C
S12206BD000210031114111C000050006000A0C1010101C0E0D111A1002011B111E100390
S12306DC011B041104180001F00D060C0002000300040005050E0D111C10040111B1100E2
S12306FC100501B0411303E081E0109041E04150705070F1707050711170419lE18102E
S122071C01020E1l061311091108lD09101413030E15140418110F02051114041811120E
S123073B04190D11061008011B110A1009011B041110030E0F040B13161E0F111B1E1113BD
S123075B010F061204100D141C161F100312100203111005121000403110D111D100C011BBF
S123077B1101100D011B04110418030D110F100E011B1113100F011B04110B0910121404B2
S122079B10131405101414061015140731l0041811150D11161000021B111A1001021B62
S12307BA04110713101F011F1F110911030A040F0E04120B0612001300031012140C101371
S12307DA140D0317140014141214011415031714021416121403141710001412100D141300
S12037FA1003011403lF020A081100121B1C140407101F180018000F0012161C13100E041D
S123081A1C060A0408100E110312151C04110D1211100E031B1215100F031B0411041817E0
A123083A0D12031000041B12071001041B04110B0F04061217041809000000000000D12005A
S123085A1002041B12041003041B0411070C060412040418120600121901000210D121D10D5
S123087A0D021B04110B120C0A0408100E110312110904181210F0D12191006041B121D1085
S123089A07041B04110418121F00080F100F1100120B1212030812060E01171200B0A0107B2
S12208BA1000F0012071C12121B0A190D101218lF0F141212030412001D121B10008041B2E
S12308D9121F1009041B0411l20B100803lB04l1120B1004140010051401l00614021007630
S12208F914031F180A04020004020900180019000A001908000802110C11180A0A0F0B95
S12309180C021C1808021E1C1118080208010l0A000B08000501050'20C0A121C0E18121C36
S12309380410120600011310C0F0C060410060C18060C020E121E08020209010A000B100152
S120958011401181ZlE00010E0412010A1140818090401910F0A01E17101B01101BB5
S12309770A190F181E120A0A18001900021210011912100E1D1110F141E0E181205001B47
S12309970A190F1E120E0A180019000206011901F181210080A120A0C0A12060E04120F0A8D
S12309B7100031810010411140B00121714090004001C18120400021C041E121512011010E53
S12309D70410121D12010419120A08100E110312002040A01191210101E041F120A121A3C
S12209F71C041E121E120310041E1114140208100E11031214090004001C18120C040A20
S1220A1600191210002121D1C041E12051211101E0410120D12110419'120A08100E11E5
S1220A3503120400A011912101C041E1204120A101E0402120A08100E110312001904OAOC
S1230A5412100E04121C151C0C191202150008l19150801B1E121600190E1201191210071874
S1220A741210101905181C041E1F04101E0412191C0F141918121000011F000A0019OB4A
S1230A9300lA00190002000l0618000E00lC001912100C191212D19120F12080000El21BA1
S12220AB3071E121B041912101E01l14121B15121000001E12100A1E12030C1A1212120F02
S1230AD2101B01141B11121006190F1A011203160A0203150109041A0F12110C081E120735
S1230AF2000C000D000E1F15050403lB0A0212081206021212081010061510031510061861
S1230B120C100A14000C0F0D11101C1210121C03111F121B121010100615100315121808B9
S1230B3215000C000D000E050403l1B0602031512100D020812191702120013021212120042
S1220B521006180C100A141A216031512100C12100C1E13090C1A12180701121108B01A1
S1230B71041A12100D1E121B12100F1E120C070A101E01141E131E120E121D001E03021234
S1220B911505021D101E12100315l2100702121B0E01121B0601101E090C180012l15087B
S1230BB0100A011408140614051318101F011410F0C1F1210101E12101F000212121412120F
S1230BD01411091007041504101E140205OA0019010C000D0A02l6031105191210101E1263
S1220BF0121002021030E10191808101F141C101E141C0F1419181212100F0A121D10000CBB
S1220C0F030D08100514121C08100514121C1E03111813110A0216010C000D0315121010
S1230C2E0C021301E0113140601100B10141C1B101F141E060C000D1000020311020C0613
S1220C4E020D1306080C030D1000020311040D1316061E1210080C030D101E100D090D0C
```

```
S1230C6D141111203111210161E131E0E1A1304061A060C000D1210041E131504101F0E184E
S1230C8D101F141C101E14151O1E12101F031112100E1A1311001F1319061A101E141F12BE
S1230CAD101F141E0311060C000D1210101F0F180B101E10030914121F101F100B09140D09
S1230CCD03111210101E12101F031112100602lA031115000D021309031112100F1A131927
S1220CED0D0A131710061515031512101F150504031501081403031B010030810041F38
S1220D0C131712041E1317051A131709041A091A0F13060C081E131712100C13000F1CB9
S1220D2B12100D1A12150F1E1317121D051A101E14020O1F091E1308071C0C1210O1E7A
S1230D4A1314000C030D000B12100B1E130404111B0D13041002021B13081003021B0411F2
S1230D6A031B000C080D0317000C0602131A120A02131A0002100311150OOD1E1317010CE3
S1220D8A080D0A02160311000C050D1210071E131D12100C110A01000C00130E010F0FD0
S1220DA91406140506011C1F03161C1F0208140A0A011D131611100F14101307130C0F49
S1220DC8140614051C1F131F1316140A0A01011E13100710C11061A0013050A1A03092E
S1230DE7041A031C1F131E210101E12210151318000C000D000E1F0F1A130510061518CD
S1230E071C0112100203151210O418111C1106041811110D1303100A011B1307100B011B04
S1220E27041110030E071011130418130C11B000C080D031706921318120A0213180D0C
S1230E46130E1002021B13121003021B041104181314403170A02130712060213070D130CEB
S1230E66100A051B1310100B051B041104181312000C050D0F04040E0404131E0F040418CF
S1230E8604000C0E0D0B100317141C001F16131C12141C001F0D000C0D0D0C100317141C5A
S1220EA6001F0B131212141C001F1302060C000D03171404121405031714061214070D7A
S1230EC5130D1008021B13111009021B04110B130C0D131F1000051B13031001051B041150
S1220EE50815041E050917051003040A1513181D02040A1F0F101E130D1003040A04183A
S1230F041302041813061310041813130D1319100A021B131D100B021B04110B13130B09E8
S1230F24060C000D040B031714021214030317140412140503130009130013060401040170
S1230F44130A0804041813081901131319130804181310DO1300100C021B1304100D021BBD
S1220F6404110B130C061303041813060D1319100E021B131D100F021B04110418131F97
S1220F8306040608100E11031211090814090E41E050002131B161309020201151309048D
S1230FA20102130815091A040A13041000009000451C16130D100005000E0D100C10100D16AD
S1230FC2180C0E1701000000000011121213090000E000500D10100C10100D16111C0E17107F
S1230FE21212110100000000D041407011018170C11180C140C10180D140D10180E140E003A
S1231002010210140A01090410080009141D0C0809141D001D141E001C141E1000141E020A
S123102210140A03190A070C08091416100811041011081000101009011409100211030035
S12210420000000000000003101211000010101C081D040B100D08100C10011B14031150
S12316011419021B140A121419031B141131419041B1418141419150011081203000317S8
S12310811405041010OD081C0F141C001B0F04100714170E14180E0E01141E14050A01146D
S12310A1080F0814100000000F0D14131002051B14171003051B041108120209041E0C119C
S12310C100140A0210040A140D0F04051C1F140100051417140310050108171F080C041E73
S12210E104150F0404110509180818000511141E04180518100511411400010C51
S12211001000C1800140C1C1F14031417F040514005140614OC15000C000D000E031B36
S123111F07010F02060B01140E030E141B0D14151000031B14011001031B1401040E140E2E
S123113F0D14081002031B14011003031B14Q1050E14010D141B1004031B14011005031BFA
S123115F1401060E14140D140E1006031B14011007031B14010D141D100C051B1401100DAD
S123117F051B0411040B0E02141D0C181413100C0405140A0818100C0405000C140A0C18A6
S122119F0214060818000C0512040A04110A100C040514150005011400C040414040F04FA
S12211BE0411141E14090B1418141C0D1412100C041B1416100D041B04110B141D141AF0
S12311DD041114180D140A100A041B140E100B041B04110B14141A041110060E100C0D1811
S12311FD14011408100518091814OC100C181F00000811OC0F14161419OOOFO01C1F1412E1
S123121D070404111F1401040B100F020C180C1010180D1618180E17191914091701111OC1
S122123D12010A00140C10060010140C0C0F100F0014181A0214071E1814410030E0010F3
S122125C04051409050E041B040307040A0217140F04101C14070C11180C140C10180DDE
S123127B140D10180E140E03041114030304101A081009141C1E140B10090C141A080C1A67
S123129B1000141C1E141B101600140914161814160900120510C1010040F10170C00100041
S12312BB1018001817001706000714OA100D1017140E0D1F1417180F01141A020817101118
S12312DB1416081417000C030D10050317141C12141C181406100608000308030404181B3F
S12212FB1100041E03040418011803041E1C00041E1600141E1B02040418131003180A31
S123131A101E14141F141E19141E04181B08010209000A000B08021000000000000007013B
S122133A00002000O3040214180D140B1004051B140F1005051B04110C16041E13100F0016
S12313591415000919040514110808OC11100017140C0F141C1414061000141C1714110F88
S12313791404081600040014081F13141D02050000141B00130C140715050103160200O3E3
S12313991400010014110013094140F1504010410416O80O0215180A141702OO140702130914BC
S12313B90C1507010116198020000030A14170A031302140415030105160400061D18141193
S12313D91011051E08051D10051D1OO51D050D0F100118051O1018040F150A1O050C181616
S12313F91405151 190F181805101018040F150A1519140410140507150O0C00141D1F1511CE
S123141911101301011F051E1014051D1015051D121005010E051E10O6051D050A121C0ODC
S1231439140D0802040F15010D00061511111C00140C040E15011511100C140E100D140FE9
S12314590309090A040B150F100C140E100D140F0209090A080B0C0214150F08020F0410FB
S123147904181E1502091C15190F041C15151904000411OD151510062081B15191007021B54
S1231499041111B10131001050000000051F151E101015OE181005O00000000050200000OF8
```

```
S12214B90002101300150A1609150A1800150A1C030F080017100808011F1517151D1359
S12314D8150E08150E101B11150501080F0A09030A080B08020A0110040F0C021518151267
S12214F808021C1215020F041512031B151413150D040F1512151514040F1512181512DB
S12215170E0115000B150015050A010F150F0F0F0F071310141C0B000213100C00150934
S123153604110D15011004021B15051005021B04110008000C0D0D0C1010121C1F15160DE8
S10E1556101203111F151E0D1C150FB1
S9030000FC
S00B0000504C495354552020D3  ---------  COPYRIGHT Telefind Inc., 1988
S11100000A100A100A180A190A1900000A192F
S12301000909090A0A0A090A0A0A09090909090909090D0E0E09090E0D0E0909090997
S12301200A0A0909090A0A090A0A0A0A0909090A0A0909090A0A090D0E0D0909090981
S12301400A0A0909090909090B0A0A0A0A090A0A0A0A0A09090909090B0E0D0E090A0A0A095B
S12301600A0A0909090909090B0A0A090A0A09090A0A090909090B0A0A090D0E0D0E093A
S12301800909090909090A0A090A0A0A0A090A0A0A09090909090A0A0E0E0D0D0D090A0A017
S12301A00090909090909090A0A090A0A0A0A090A0A0A0909090909090A0A0E0D0E0E0E090A0A0AF5
S12301C00A0A090A0A0A0A0A090A0A0A09090909090A0A0E0E090909090D0E0E0E0909090C9
S12301E00A0A0A0B0A0A0A0A090A0A090909090A0A0A0B0E0E0D0D0D090A0A0A0909090B1
S12302000A0A0B0A0A0A0A090A0A0A09090909090A0A0B0E0E0D0D0D090A0A0A0909090992
S12302200A0A0A090A0A090A0A0A0A0A0A0A0909090D0D0E090D0E090D0D0E0E0D0909090962
S12302400090A0A0A0A090A0A0A090909090909090E0E0D0E0E090E0D09090909090952
S12302600A0A0A0A0A09090A0A0A0A0A0A090909090D0E0D09090D0D0E0E0D09090909092B
S12302800A0A0909090A0A0A0A090A0A0A0A0909090A0A09090E0E0D0D0D090A0A0A090909016
S12302A00A0A09090A0A0A0A090A0A0A090909090A0A09090E0E0D0D0D090A0A0A090909F6
S12302C00A0A0A0A090909090A0A0A0A0A090A0A0909090D0D0D0E0909090E0D0D0D090A0A090A09C5
S12302E00A0A0A0A0A0A090A0A0A0A090A0A090A0A0A0090A0A090D0E0D0E0D0D090D0D0D0E0D0E090990
S12303000909090A0A0A0A090A0A0A0A0A0A0A090909090A09090E0D0D0E090909090E0D0D0E0E0909090964
S12303200909090A0A0A0A090A0A0A0A0A0A0A09090909090D0D0E090E0D0E0E0E0D0909090946
S123034009090A09090A09090A0A0A0A0A0A090909090D0E0D0E090E0D0D0E0E0909090927
S12303600909090A090A09090A0A0A0A0A0A090909090D0E0D0E090E0D0D0E0E0909090927
S1230380090909090909090909090909090909090909090909090909090909090909090909090939
S12303A00A0A090A0A0A0A0A090909090909090A0A0909090E0D09090909090909090902
S12303C00909090A0A0A090A0A0A0909090909090909090909090909090909090909090909090909090909090909090F2
S12303E00A0A0A090A0A090A0A0A0A090909090A0A0A090A0A090E0D090909090909090BC
S12304000A0A0A0A0A0A0A090A0A0A090A0A0A0E0D0D0E0E09090E0D0D0D090A0A0A7A
S12304200A0A0A0A0A09090A0A0A090A0A0A0D0E0E0E0E09090E0D0D0D090A0A0A5A
S12304400A0A0A0A09090A0A0A0A090A0A090909090D0D0D0E09090E0E0D0D0D090A0A0A0943
S12304600A0A0A09090A0A0A0A0A090A0A0A09090A0A0A09090E0E0D090A0A0A0909090934
S12304800A0A0A090A0A0A090A0A0A090A0A090909090E0D0D0E090A0A0A090E0E090A0A0A0908
S12304A00A0A0A0A090A09090A0A0A0A090A0A0A0E0D0E090E0E090E0E0D0D0D090A0A0A0ADB
S12304C00A0A0A0A0A09090A0A0A090A0A0A090E0D0D090909090E0D0D0D090A0A0A0AC1
S12304E00A0A0A0A090A09090A0A0A0A090A0A0A0E0D0E090E0E090E0E0D0D0D090A0A0A9B
S12305000A0A090909090909090909090909090909090A0A0A0909090909090909090909090909090909B3
S12305200A09090909090909090909090909090909090A09090909090909090909090909090909090995
S12305400A0A0A0A0A0A0A090A0A0A0A090A090A0D0D0E0E0D0909090D0D0E0E090A090A40
S12305600090909090A0A0A090A0A0A090909090909090909090E0D0E090900D0E0E090909092F
S12305A00A0A0A0A0A0A090A0A0A0A0A0A0A0A090D0D0D0D0909090D0E0D0E090D0D0E0909090C4
S12305C0090A0A0A0A0A09090A0A0A0A0A0A0A090909090D0D0E0090D0E0D0E0909090C4
S12306000906180A1116170D0317170130D00130711080021A1108021A150B11170B170B17F9
S12206200C030B050A1E0C03190B1E1110060606 0B060B030203190C030D030D030D036E
S122063F0A1E180B170B1712170C011A0B190C020D02150B1211100D040B1211100D04D0
S123065E0B0210110B000B041B0B00150B1311100D040A1311100D040B020B041B151C15D9
S123067E1C1C0D020D020B1D09011C1709011C0B110D020D02110D010B1E09021C09021CA7
S122069E11101104021D00031407150B150D020D02101116120C0217120C02170B1E02A3
S12206BD0D01110B1E030B150D030D030D0311101104021E150B1611100D040A16111080
S12306DC0D040B020B041F0D010D020D020D020D020D020D020D01150B17111000D040A18AD
S12306FC11100D040B02110B1C101314180B000B000D011518180D01150B190B001306043C
S122071C1409010B19150B190B19151911041 10B1C13170B040B190D010A180B040B18E1
S123073B0B00150B1A11100D040A1A11100D040B02110B1C0D01150B101314151A170A173C
S123075B09011B101104110402031A0C02170C020B1E0C02170C020B1E150B1B11100D04D7
S123077B0A1C11100D040B020B041C150B1C11100D040A1C11100D040B02151D0C060C02A5
S122079B0C060C020C060C020C060C020B1B0B040B1C150B1D11100D040A1D11100D04B7
S12307BA0B02150B10131417150B170A170C03170C030B070D010D010D030C010C020C01AD
S12307DA0C020B1D0C040C04170C040C040B1D0C040C04170C040C040C020C010C020C01B39
S12307FA0C03140C031518181110010B0702031811101116 0D030606060B120203180C0360
S123081A18190C030D030D030D030A050B17150B0111100D040A0111100D040B020B041954
S123083A150B0211100D040A0211100D040B02151A0B050A020B041A00000000000150B0364
S123085A11100D040A0311100D040B02151B0C030A040B040B03150B0311100D040A03111F
```

```
S123087A100D040B02150B040C030D030D030D030A1E0B040B03150B0411100D040A04110F
S123089A100D040B020B040B040D000D030D030D03150B050D000A010C001D0B050C00111E
S12208BA100606060B0602030B050D060A0C030606050C030B070D03150B0611100D040D
S12308D90A0611100D040B020A0511100D040B020A050C020C040C020C040C020C040C02E7
S12208F90C041116130B1B0D000D000D030D030D040D010C000C00110801160D000D00B1
S12309180C0018180C00110C01160C000C000D000D000C000C000C000C040B090C030B09A2
S12309380B180A0B0D0712170C011A0B181A0C031B0C001A0B090C000D000D000D000C0718
S1220958140C07150B090D070C030B000A1E0C030C030C010B0B1C09021B0C03140C0321
S12309770C010C031B0A000C030D0309020B090D030A0909021C0C020C020C030B150D0338
S12309970C0109020B0D0C030D0309021D0D030C030B090C040A000C040B130C030B0F1110
S12309B70C03060C02000B1E11010B0F101106110602030B0E0D021108020B0E0B0F0C02DD
S12309D708020B0E0B0F0C060A000D030D030D030D020C040D030A090C0208020B000B10F3
S12209F71108020B0F0B100408020B1E0C020D030D030D03101106110602030B100C04AA
S1220A160D030A0909020B111108020B110B110C0208020B110B110C060A000D030D0394
S1220A350D030C040D030A091108020B120B120C0208020B000D030D030D030D030C0493
S1230A540A090C030B120A050C060B130B060C060A0609020B1309031B1B09030B090C0333
S1220A740A090C0311061108021B1C0C02000B0B02050C03030B090D030D040D010D0344
S1230A930D030D030D030D030C030D010D030D030A090C010B160C010B150B1609010B1509
S1220AB309020B150C010A09174171500B1B150B090D010A0909020B1B0C030B160B1B87
S1230AD20C03140C03150B090C010C031F0B1A110D010B1E10110B14030B190202150B175B
S1230AF20D020D020D0211160C030B1D09010B19170901170B19170C0316170B1E0C03063A
S1230B12110C03040D020D02100402170417020B1E030B180A09170C0316170B1E0B170231
S1230B32160D020D020D020C030B1D0C010B1E0A0909031A0B1A09030B1B09030B1A0B1B08
S1220B520C0306110C03041117110B1E0A09130A0909020B090C030B1E0C030A1B0C0312
S1230B710C030A0909020B1B0A0909020B1C0C040C03140C0309030B1C0A0C0D0309031C05
S1220B911C09031C0C0217110B1E0A0909030B1D0C030B1D0C030C02141106010B1D06A9
S1230BB00C031404020C030C030A0F0C03140C030C030B090C02170C0209030B1F0C0317DD
S1320BD00C030D030C030A060C020C030C040D030D020D020D01110B1E0C010A090C0217DB
S1220BF00A0909030B010C0306110C0204020C020402050C03030B090C040B0C100C02F8
S1220C0F0D02110411041702110411041702180B1E030B000D01110D020C020B1E0A0965
S1230C2E09030B070C030B030C03101111040219_0C020C010D020D02110D010B1E09021A61
S1220C4E09020B020D020D020D02110D010B1E09020B0209010B090D020D020C02151B141B44
S1230C6D0C05170B1E0A0909010B040C030B040C030D020D020A0909010B04110C03140635
S1230C8D0C0204020C02041C0C02170C020B1E0A090C030B0609030B050C030C020C051711
S1230CAD0C020C050B1E0D020D020A090C031406110C02151E140417060C02151E14041E83
S1230CCD0B1E0A090C02170C020B1E0A090D01110B1E0A0609030B070B1E0A090C030B0785
S1220CED0C040B070C03161F0B1E0A0911160C030B1E10020C030B1D170C03061708024D
S1220D0C0B081708020B080C040A08110B140C04030B090202150B080A09020A080C03A2
S1220D2B0B090C030B1B09020B090A0C0C030C020C030D0309020B0A0C03170A09090287
S1230D4A0B0A0D020D020D010A0909020B0C0B171A150B0B11100D040A0B11100D040B0222
S1230D6A0D030D020D020B1D0D0209010B061709010B060D01110B1E0A0609020B0C0D022A
S1220D8A0D020D01110B1E0D020D020A0909020B0C0A0911100C031002011D0C031D05F8
S1220DA90C030C030C0302031D1D02031D020C030C03150B0E10041404150B0E0B0E05D3
S1220DC80C030C0302030B0D0A0E0C030C0309020B0F0C0311100C04010B0F0C040011F6
S1230DE70B140002030B030A090C02150B09150B0F0D020D020D02110C030B100C03161194
S1230E070C03170C030B1E0A090B040B1D0A1C0B040B1A150B1111100D040A1111100D0415
S1220E270B02110B1C15190A170B040B110A190D020D020B1D09010B121709010B121506
S1230E460B1211100D040A1211100D040B020B040B120B1D09010B141709010B14150B13EE
S1230E6611100D040A1311100D040B020B040B130D020D020D010D010B110B130D010B041C
S1230E861C0D020D0211100B1D040200031C0B1417040200031C0D020D0211100B1D0402D8
S1220EA60003AD0B1517040200030B150D020D020B1D0C02170C020B1D0C02170C0215C0
S1230EC50B1611100D040A1611100D040B02150B18150B1611100D040A1711100D040B0257
S1220EE510110B000D04101104100B01030B1711100B010605151F0B1704100B010B048A
S1230F040B180B040B180B180B040B16150B1811100D040A1811100D040B02150B1A0D010E
S1230F240D020D020B000B1D0C02170C021B1D0C02170C020B1C09040B1A0B1A0B010B0134
S1230F440B190D010B040B1A13140B1A170B190B040B18150B1B11100D040A1B11100D04A6
S1220F640B02150B1B130B1C0B040B1B150B1B11100D040A1B11100D040B020B040B1BAD
S1220F830C03130D030D030D030A1E100C040B001009020B1C110B1D09021D110B1D10BA
S1230FA209020B1D111D110B011011040D030B0102030B1D0010160D02170C02160C0216AB
S1230FC2110802161300000000001217120A1F0D02101617170C02160C0216110C0216176C
S1230FE2161716130000000C030B0017171160711108020C021108020C021108020C021094
S12310021616170B00170C0300100D040A00100D040A0010110A0010110A0011130A01106B
S1231022110A01101519140209040B011702170B0017061717170C04140C041716161700F6
S1221042000000000000000013111616000001A001702170B000C01060C0C011009040B030D8E
S12310610A0309040B030D0A0309040B030D0A0309040B030D0A030D171602161700130340
S12310810B040B000C010602050B020D040D010015 0B04170B04130C000B040B050C001344
S12310A106060217000D060D06150B0511100D040A0511100D040B0210110D040B001110DD
```

```
S12310C1010B0610110B010A06050B0102030B0609030B060B070C031410151E14100B00D1
S12210E10B000D010B041F0C060C0609031F0B070C060C060C03160B0811100B080D03A4
S12211000C0306010B0802030B080A0F050803180D030B080C03160D020D020D020B1DAD
S123111F0C030C01190C030C0109010B09150B0911100D040A0C11100D040A0C09010B0A65
S123113F150B0A11100D040A0C11100D040A0C09010B0B150B0A11100D040A0C11100D040E
S123115F0A0C09010B0B150B0B11100D040A0C11100D040A0C150B0B11100D040A0C11l0E7
S123117F0D040B020B000C010B0C0C060B0C0C030B010B0D0C060C030B010D030B0D0C063C
S122119F1D0B0D0C060D0310110B010B041D0C0308030B0D0D03140C030B110B0E0D01D5
S12211BE0B040B0D0B0E150B0D0B0D150B0E11100D040A0E11100D040B02150B0E0B0F8A
S12311DD0B040B0E150B0F11100D040A0F11100D040B02151F0B070B041F131700110C064C
S12311FD0B100B100C03060C060B100C030606100602100703001B0B1006060602030B10A4
S123121D0D010B04180A0F0B001005000708021611080216110802161519OB121613121719
S122123D121709010B12170901170B1207030009010B1211100B13151A0B1209011B17F1
S122125C0B010A1309011B1A0B151B0B0100030B130B00020B11071108020C021108022B
S123127B0C021108020C021C0B040B140D010010110411040202030B140011070A1411071004
S123129B04050402030B140009010B150B15150B1509011D101100171410001007051705C4
S12312BB171705171705170C011E0B16171417150B1614060B15130C030B1614061300150F
S12312DB0B16140A160D020D0210110B1D0402130402030B1700170C000D000D010B041F83
S12212FB11100B000D010B041811100B0011100B0011100A00170D010B04180C0306117A
S123131A0C02040C020C06120C020C03170C000D000D000D000C0000000000000D040D04D6
S122133A0D040D040B1B1116150B1A11100D040A1A11100D040B0210110B0012170C01F0
S12313590B1A0D04120B010A1A111007100405150B1B140402030B1B04050402030B1B06FB
S12313790B1B11100606060B1C06030B1B131309040B1C0D030D030D030D040D030D0110D8
S12313990B1D09040B1D0D030D030D040D030D01101116130B1E09040B1E0D030D03AB
S12313B90D030D040D0311160D0110130B1E170D030D030D040D030D011011160C01A4
S12313D911100B04020B04130B04110B040B05070C040C0417110C04030B000C04070803CE
S12313F90C040A0007110C0417110C04030B000B000C04170C0411100602060B1F060B009C
S12314191000C030505180B040C030B040C030B04100C0405190B040C040B040B05110C0486
S12314390C040C0008040B030C041A0B02110C040C0408040B030B020C040C040C040C048A
S12314590D000D000D000B030C040C040C040C040D000D000D000C001B0B030C000D011074
S12314790B041B0C04151C0B030D0102030B030B170B17150B0411100D040A0411100D04DC
S12314990B021C00101605170000000013060B0400110A05111617000000000131300000018
S12214B900170011100A0611100A0611100A06111070C001016131705060B060B0603A2
S12314D80B06020B060C03150B090D00100D000D000D000C000C001017130C000B070B07CE
S12214F80C0002030B0817130B0709030B08030B0817130B07030B0813170B07030B0799
S12215170C000B09150B090A090C00060B07130D04111011040219OD0312170C010B0A61
S12315360B17150B0A11100D040A0A11100D040B02001A0D020D021110041702030B0A0A23
S10E155604170B1E030B0A0A020A0A0A
S9030000FC
```

We claim:

1. A RF paging receiver for receiving pages transmitted from either a frequency modulation digital paging transmitter or from a frequency modulation analog paging transmitter in which characters of the page are transmitted by frequency modulation of a carrier with a plurality of frequencies being used to encode the characters with the carrier being frequency modulated by the plurality of frequencies comprising:
   (a) means for receiving and discriminating the modulated carrier into a signal having discrete frequencies with each frequency being one of the plurality of frequencies;
   (b) amplifying means coupled to the means for receiving and discriminating for amplifying the signal to create a square wave having a period equal to a period of the sinusoidal signal;
   (c) digital filtering means coupled to the amplifying means, having a plurality of distinct pass bands each centered around a different one of the plurality of frequencies, the digital filtering means outputting a square wave when the square wave period falls within one of the pass bands of the digital filtering means and blocking passage of all square waves falling outside the pass band of the digital filtering means;
   (d) counting means, coupled to the digital filtering means, for converting each output of the digital filtering means into a number proportional to the period of the square wave passed by the digital filtering means; and
   (e) character processing means, coupled to the counting means, for outputting characters each having an identity determined by the value of one or more numbers produced by the counting means.

2. A RF paging receiver in accordance with claim 1 wherein:
   the counting means samples the output of the digital filtering means at a frequency higher than the highest of the frequencies.

3. A RF paging receiver in accordance with claim 2 wherein the counting means comprises:
   (a) means, responsive to the output of the digital filtering means, for sampling the output of the digital filtering means with a fixed frequency over a fixed period of time to produce a number of samples directly proportional to the frequency of the square wave passed by the digital filtering means;
   (b) a counter, coupled to the means for sampling, for counting the number of samples of the output of the digital filtering means which have a high state during the fixed time period of sampling; and wherein
   (c) the count of the counter is processed by the character processing means to output the characters.

4. A RF paging receiver in accordance with claim 3 wherein the character processing means comprises:
 (a) a first memory for storing a plurality of ranges of addresses with a different range of addresses being associated with each one of the frequencies, each range of addresses defining a narrower frequency range pass band than a corresponding frequency range passed by the digital filtering means;
 (b) comparator means, coupled to the counting means and to the first memory, for outputting the count of the counter when a comparison of the count falls within one of a plurality of ranges addresses stored in the first memory and not outputting the count of the counter means when the count falls outside all of the addresses stored in the first memory;
 (c) a second memory, coupled to the output of the comparator means, for outputting a value stored at an address equal to the count outputted by the first comparator, the second memory having a plurality of addresses associated with each of the plurality of frequencies with each address associated with a separate one of the plurality of frequencies storing a single value; and
 (d) the values of the output of the second memory are processed to output the characters.

5. A RF paging receiver in accordance with claim 4 wherein the character processing means further comprises:
 means for combining successive values and processing the combined successive values into a character.

6. A RF paging receiver in accordance with claim 2 wherein:
 the plurality of frequencies is equal to sixteen and each frequency is used to encode one of 16 possible values of character data.

7. A RF paging receiver in accordance with claim 6 wherein:
 the characters are encoded at the transmitter with a two digit base ten encoding format and two successive frequencies are used to transmit a single character.

8. A RF paging receiver in accordance with claim 2 further comprising:
 a shift register having an input coupled to an output of the amplifying means and an output coupled to the digital filtering means, the shift register having a number of stages requiring a predetermined time duration-of the square wave produced by the amplifying means to be applied to an input to produce an output, the shift register being periodically reset.

9. A RF paging receiver in accordance with claim 5 wherein the character processing means further comprises:
 (a) signal duration comparison means, having an input coupled to the output of the second memory, for outputting the value if it has a duration greater than a predetermined time duration and not outputting any value if any value applied to the input has a duration less than the predetermined duration; and
 (b) the output of the signal duration comparison means is processed to output characters.

10. A RF paging receiver in accordance with claim 8 further comprising:
 means, coupled to the output of the amplifying means, and to the input of the shift register for lessening frequency jitter in the square wave applied to the shift register.

11. A RF paging receiver in accordance with claim 1 wherein:
 the signal is sinusoidal.

12. A RF paging receiver for receiving pages comprising characters, transmitted from either a digital paging transmitter for transmitting pages with a digital transmission protocol utilizing a frequency modulated carrier modulated to have two possible frequencies with the two frequencies encoding characters or from an analog paging transmitter for transmitting pages with an analog transmission protocol utilizing a frequency modulated carrier modulated with a plurality of frequencies for encoding characters, with each received page which is transmitted with a modulated FM carrier from either a digital paging transmitter or an analog paging transmitter being transmitted with a transmission protocol, different from the analog and digital transmission protocols but compatible with either the analog or digital transmitter being used to transmit other pages respectively with the analog or digital transmission protocol, and utilizing a plurality of frequencies chosen from a group of frequencies with each frequency encoding a different value for encoding both numeric characters and alphanumeric characters with each character being encoded with at least one value, the protocol not preventing the transmitter transmitting each page from transmitting pages with either the digital or analog transmission protocol, comprising:
 (a) a RF tuner for receiving a page, transmitted from either a digital paging transmitter or an analog paging transmitter on a frequency modulated carrier with the received page modulating the frequency modulated carrier with frequencies from the transmission protocol using frequencies; and
 (b) a processor, responsive to the RF tuner, for decoding the received frequency modulated carrier which has been modulated with frequencies chosen from the group of frequencies into characters.

13. A RF paging receiver in accordance with claim 12 wherein:
 the group of frequencies contains more than two frequencies.

14. A RF paging receiver in accordance with claim 13 further comprising:
 (a) an IF section, coupled to an output of the RF tuner, for producing an output containing the frequencies which modulate the carrier; and
 (b) an amplifier, coupled to the output of the IF section, for amplifying the frequencies to create a square wave having a period equal to a period of each outputted frequency, the output of the amplifier being coupled to the processor.

15. A RF paging receiver in accordance with claim 14 further comprising:
 a plurality of digital filters coupled to the output of the amplifier, each digital filter having a distinct pass band centered around a different one of the plurality of frequencies in the group of frequencies, outputting a square wave when the square wave period falls within the pass band of the digital filter, blocking passage of square waves falling outside the pass band of the digital filter and having an output coupled to the processor.

16. A RF paging receiver in accordance with claim 15 further comprising:
 a counter, coupled to the output of each digital filter, for converting each output of the digital filters into a number proportional to the period of the square wave passed by each digital filter, the number proportional to the period of the square wave being coupled to the processor.

17. A RF paging receiver in accordance with claim 16 wherein:
the counter samples the outputs of the digital filter at a frequency higher than the highest of the frequencies.

18. A RF paging receiver in accordance with claim 17 wherein:
the counter samples the outputs of the digital filter with a fixed frequency over a fixed period of time to produce a number of samples directly proportional to the frequency of the square wave passed by one of the digital filters which have a high state during the fixed period of sampling.

19. A RF paging receiver in accordance with claim 18 wherein:
the processor is responsive to the counter and outputs characters each having an identity determined by the value of at least one number produced by the counter.

20. A RF paging receiver in accordance with claim 19 further comprising:
(a) a first memory for storing a plurality of ranges of addresses with a different range of addresses being associated with each one of the frequencies, each range of addresses defining a narrower frequency range pass band than a corresponding frequency range passed by one of the digital filters;
(b) a comparator, coupled to the counter and to the first memory, for outputting the count of the counter when a comparison of the count falls within one of a plurality of ranges of addresses stored in the first memory and not outputting the count of the counter when the count falls outside all of the addresses stored in the first memory;
(c) a second memory, coupled to the output of the comparator, for outputting a value stored at an address equal to the count outputted by the comparator, the second memory having a plurality of addresses associated with each of the plurality of frequencies with each address associated with a separate one of the plurality of frequencies storing a single value; and
(d) the values of the output of the second memory are processed by the processor to output the characters.

21. A RF paging receiver in accordance with claim 20 wherein:
the processor combines two successive values and processes the combined successive values into a character.

22. A RF paging receiver in accordance with claim 21 wherein:
the plurality of frequencies are equal to sixteen and ten frequencies are used to encode the values of character data.

23. A RF paging receiver in accordance with claim 22 wherein:
(a) alphanumeric characters are encoded at the transmitter with a two digit base ten encoding format and two successive frequencies are used to transmit a single character; and
(b) the processor decodes successive frequencies into alphanumeric characters.

24. A RF paging receiver in accordance with claim 13 further comprising:
a shift register having an input coupled to an output of the amplifier and an output coupled to inputs of the digital filters, the shift register having a number of stages requiring a predetermined time duration of the square wave produced by the amplifier to be applied to an input to produce an output, the shift register being periodically reset.

25. A RF paging receiver in accordance with claim 20 further comprising:
(a) a signal duration comparator, having an input coupled to the output of the second memory, for outputting a value if the output of the second memory has a duration greater than a predetermined time duration and not outputting any value if any value applied to the input of the signal duration comparator has a duration less than the predetermined duration; and
(b) the output of the signal duration comparator is processed by the processor to output characters.

26. A RF paging receiver in accordance with claim 25 further comprising:
means, coupled to the output of the amplifier and to the input of the shift register, for lessening frequency jitter in the square wave applied to the shift register.

27. A RF paging receiver in accordance with claim 13 wherein:
each page is transmitted with a command which commands the processor of the paging receiver to process the page in accordance with a function specified by the command.

28. A RF paging receiver in accordance with claim 27 wherein:
the command commands the processor to process the page as a page numeric page.

29. A RF paging receiver in accordance with claim 27 wherein:
the command commands the processor to process the page as an alphanumeric page.

30. A RF paging receiver in accordance with claim 27 wherein:
the command commands the page to be outputted to an external jack.

31. A RF paging receiver in accordance with claim 13 wherein:
the processor decodes the frequencies carried by the frequency modulated carrier into successive values and each value is decoded into a character.

32. A RF paging receiver in accordance with claim 13 wherein:
the processor decodes the frequencies carried by the frequency modulated carrier into successive values and decodes each two successive values into a character.

33. A RF paging receiver in accordance with claim 31 wherein:
each page is transmitted with a numeric page command containing a paging receiver identification code.

34. A RF paging receiver in accordance with claim 32 wherein:
each page is transmitted with an alphanumeric page command containing a paging receiver identification code.

* * * * *